(12) United States Patent
Coote

(10) Patent No.: US 10,243,787 B2
(45) Date of Patent: Mar. 26, 2019

(54) SYSTEM FOR CONNECTING AND CONTROLLING MULTIPLE DEVICES

(71) Applicant: Centrica Hive Limited, Windsor, Bershire (GB)

(72) Inventor: Matthew Timothy Coote, Kent (GB)

(73) Assignee: Centrica Connected Home Limited, Windsor, Berkshire (GB)

( * ) Notice: Subject to any disclaimer, the term of this patent is extended or adjusted under 35 U.S.C. 154(b) by 0 days.

(21) Appl. No.: 15/510,526

(22) PCT Filed: Sep. 10, 2015

(86) PCT No.: PCT/GB2015/052619
§ 371 (c)(1),
(2) Date: Mar. 10, 2017

(87) PCT Pub. No.: WO2016/038374
PCT Pub. Date: Mar. 17, 2016

(65) Prior Publication Data
US 2017/0244597 A1    Aug. 24, 2017

Related U.S. Application Data

(60) Provisional application No. 62/048,914, filed on Sep. 11, 2014.

(51) Int. Cl.
*H04L 12/28* (2006.01)
*H04L 12/24* (2006.01)
(Continued)

(52) U.S. Cl.
CPC ........ *H04L 41/0803* (2013.01); *H04L 12/281* (2013.01); *H04L 12/2818* (2013.01);
(Continued)

(58) Field of Classification Search
CPC . H04L 41/0803; H04L 69/18; H04L 12/2818; H04L 12/281; H04L 12/2834; G06F 3/0484
See application file for complete search history.

(56) References Cited

U.S. PATENT DOCUMENTS 6,434,447 B1    8/2002  Shteyn
2002/0029256 A1  3/2002  Lintel et al.
(Continued)

OTHER PUBLICATIONS

PCT International Search Report and Written Opinion from International Application PCT/GB2015/052619, dated Dec. 7, 2015, 16 pages.

*Primary Examiner* — Lakeram Jangbahadur
(74) *Attorney, Agent, or Firm* — Tucker Ellis LLP; Michael G. Craig

(57) ABSTRACT

The present invention provides a platform that enables devices, services and applications to be connected together. An in-home gateway device provides the hub for this connectivity, by connecting and coordinating in-home (and/or in-office) devices and cloud-based services. Creating a "connected environment" via this platform requires co-ordinating multiple device manufacturers and service providers, and multiple standards/protocols. Advantageously, the platform removes the requirement for different manufacturers of different devices to adopt common protocols to enable device connection, and further, the platform removes the burden of configuration away from the consumer.

23 Claims, 9 Drawing Sheets

(51) Int. Cl.
*H04L 29/06* (2006.01)
*G06F 3/0484* (2013.01)

(52) U.S. Cl.
CPC ...... *H04L 12/2825* (2013.01); *H04L 12/2834* (2013.01); *H04L 69/18* (2013.01); *G06F 3/0484* (2013.01); *H04L 12/282* (2013.01)

(56) References Cited

U.S. PATENT DOCUMENTS

| | | | |
|---|---|---|---|
| 2009/0303926 A1 | 12/2009 | Den Hartog et al. | |
| 2009/0327496 A1* | 12/2009 | Klemets | H04L 12/2818 709/227 |
| 2012/0011222 A1* | 1/2012 | Yasukawa | H04L 67/16 709/217 |
| 2014/0001977 A1* | 1/2014 | Zacharchuk | H04L 12/2816 315/291 |
| 2014/0159879 A1* | 6/2014 | Rezvani | G06F 21/31 340/12.22 |

* cited by examiner

SYSTEM FOR CONNECTING AND CONTROLLING MULTIPLE DEVICES

FIELD OF THE INVENTION

The present invention generally relates to systems, methods and computer program code that enable devices, services and applications to be connected together. More particularly, the invention provides systems and methods for connecting together physical devices made by a variety of manufacturers to provide an Internet of Things.

BACKGROUND OF THE INVENTION

There are a large number and wide variety of home and office appliances and physical devices available for the consumer on the market. It is becoming more common for such consumer electronic goods and appliances to be connected to each other, and/or to be connected to the internet to enable a user to control and/or monitor a particular device via the internet, when the user is located remote from the particular device itself.

The proliferation of connected devices in the home/office creates a need for a simpler user experience. In the 1990s, a household typically contained only one physical device that was connected to the internet—the personal computer (PC). Today's households and offices generally have several connected devices (e.g. PCs, smartphones, tablet computers, TVs, smart thermostats, etc.), and it is feasible that future households will have tens, perhaps hundreds, of connected devices. Examples of connected devices and software applications ("apps") currently available on the market are physical devices and apps which enable a user to monitor their energy consumption (e.g. gas and/or electricity), and determine how they are using the energy in their home/office. For example, a particular physical device may be a smart energy monitor that is able to determine how much energy is used in a home for different categories of energy usage, such as lighting, heating, cooking etc. The physical device may be connected to the internet and may be remotely monitored by a user via a user interface (UI) or app on a user's smartphone. Another example of a connected physical device is a smart thermostat, which could be monitored remotely by a user and may be controllable remotely to allow a user to turn the heating on he returns to his home/office, or to turn the heating system off automatically when he indicates he is no longer in his home.

Ordinary consumers may not have the time, interest or ability to devote their attention to individually monitoring connected devices (e.g. to check that they are operating as expected). For example, a typical consumer may not have the time or interest to engage with their smart thermostat to control their heating system and would rather use a device which automatically controls their heating system. For some users, it would thus be preferable if the connected devices were largely autonomous, working unobtrusively in the background, taking care of themselves in regard to provisioning of resources, updating, and everyday performance.

Furthermore, ordinary consumers may not have the time, interest or ability to configure the devices to create a "connected environment" (e.g. a "connected home" or "connected office". Creating a "connected home" typically requires the use of an in-home hub device (a hardware device) to which all physical devices and appliances are connected. The hub may enable low-power edge devices in the home/office to connect to the internet, to services accessible via the cloud, or to other devices via the internet. This is generally enabled by the use of a gateway (a network node, telecommunications router or proxy server that is able to route data between networks that may use different communication protocols, or a computer/computer program that is configured to perform the same tasks). The gateway may be accessible via the hub, or the hub may contain a computer program/software that performs the task of a gateway. The gateway translates between internet protocols and different communication protocols (e.g. the ZigBee® protocol used to create personal area networks).

Generally speaking, electronic devices have previously been connected to the internet in an uncoordinated manner, with each device manufacturer using their own methods and preferred communication protocols. Consumers who own different electronic devices from different manufacturers/vendors are often faced with the difficulty of having to use different techniques to configure each electronic device to connect to the internet, which makes it difficult for a user to monitor/control their devices remotely. Furthermore, there may be a lack of interoperability between electronic devices even if they are advertised as being able to connect to other electronic devices.

The present applicant has recognised the need to provide a platform which more simply enables multiple different home and office electronic devices to be connected to the internet, and to each other.

SUMMARY OF THE INVENTION

Broadly speaking, embodiments of the present invention relate to the provision of a system that enables devices, services and applications to be connected together to create a "connected environment" and/or to a system that provides a simplified way of creating an "Internet of Things" (a term used to mean the interconnection of uniquely identifiable devices within the existing internet infrastructure). An static hub (e.g. based in a home or office) typically enables the connecting and coordinating of devices and cloud-based services within an environment, as well as enabling connections to a user interface for monitoring and control of the connected devices. Creating a "connected environment" via this system requires co-ordinating physical devices made by multiple manufacturers, services provided by multiple service providers, and multiple standards and communication protocols. Advantageously, the system removes the requirement for different manufacturers and service providers to adopt common protocols to enable physical device connection and service provision. Moreover, the system advantageously removes the burden of configuration away from the consumer.

Specific knowledge about the implementation details of the physical devices is removed from the system, which simplifies the creation and management of the system. This is achieved by providing two layers of abstraction between the physical devices and the user interface used to monitor/control the physical devices, preferably in combination with an object capability model. The platform used to implement the system (i.e. software or hardware architecture) may be provided in a hub device or in the cloud/remote server. Additionally or alternatively, the functionalities of the platform may be distributed between the hub and the cloud/remote server(s).

Thus, according to a first aspect of the present invention, there is provided a system for interconnecting and coordinating a plurality of devices, services and applications, the system comprising: at least one physical device; a precedent module which comprises a database storing at least one pre-defined canonical device, wherein the canonical device corresponds to a pre-defined canonical form, the canonical form defining a set of minimum capabilities for a type of physical device, wherein the at least one physical device is associated with at least one canonical device which matches at least some of the capabilities of the physical device; an archetype module which comprises a database storing one or more synthetic devices, wherein each synthetic device comprises one or more canonical devices and at least one rule, the at least one rule defining how the one or more canonical devices are combined to form the synthetic device; and at least one processor which is configured to: associate the at least one physical device to the at least one pre-defined canonical device by comparing the capabilities of the physical device with the set of minimum capabilities defined by the canonical form; and control the at least one physical device via the associated canonical device by applying the at least one rule for a synthetic device incorporating the associated canonical.

In embodiments, the system may further comprise a plurality of physical devices. That is, the system may enable the control of at least one physical device, or multiple physical devices.

According to a second aspect of the present invention, there is provided a system for interconnecting and coordinating a plurality of devices, services and applications, the system comprising: a plurality of physical devices; a precedent module which comprises a database storing a plurality of pre-defined canonical devices, wherein each canonical device corresponds to one of a plurality of pre-defined canonical forms, each canonical form defining a set of minimum capabilities for a type of physical device, wherein each of the plurality of physical devices is associated with at least one canonical device which matches at least some of the capabilities of the physical device; an archetype module which comprises a database storing one or more synthetic devices, wherein each synthetic device comprises one or more canonical devices and at least one rule, the at least one rule defining how the one or more canonical devices are combined to form the synthetic device; at least one database storing the plurality of pre-defined canonical forms and an object capability model which controls the security permissions associated with each canonical and synthetic device; and at least one processor which is configured to: associate each of the physical devices to one of the pre-defined canonical devices by comparing the capabilities of each physical device with the set of minimum capabilities defined by one of the canonical forms, and selecting the canonical device corresponding to the canonical form which matches the capabilities of the compared physical device; and control each of the plurality of physical devices via the associated canonical device by applying the at least one rule for a synthetic device incorporating the associated canonical device and by applying the permissions set by the object capability model.

The following features apply equally to each of the above aspects of the invention.

In embodiments, a first abstraction layer or module (also called a "precedent module") is used to abstract the physical devices in the system. The canonical forms may be used by the first abstraction layer to strip physical devices of their implementation details so that the physical devices in the system are defined only by their behaviours/functionalities. A canonical device (i.e. a virtual device defined by some software) is used to represent at least some of the functionality of the physical device in the system which has the behaviours defined by a particular canonical form. The canonical device has a state or set of states, can accept commands and can emit events as it senses changes in its state. The canonical device is preferably pre-defined in the system, and the monitoring/controlling of a physical device is performed via its associated canonical representation. This simplifies the monitoring/controlling because the system does not need to know anything about the brand or version of the physical device in order to interact with the physical device. The system only needs to know that the physical device has certain known, pre-defined behaviours (defined by the or each canonical form—where multiple canonical forms are captured in one physical device).

The second device abstraction layer/module (also known as an "archetype module") may comprise a database or store of one or more synthetic devices. A synthetic device is a virtual device (piece of software) which embodies intelligence for other devices (physical, canonical or synthetic) that complies with a particular canonical form. Synthetic devices may be formed by combining one or more canonical devices with a proposition/rule that defines how the canonical devices are combined to define the overall behaviour/function of the synthetic device. Synthetic devices may be formed by combining one or more canonical devices with one or more synthetic devices, and/or by combining two or more synthetic devices. A user may be able to monitor and/or control a synthetic device via the user interface. Consequently and indirectly, a user may be able to control real, physical devices that underlie the synthetic device. All synthetic devices which follow the same canonical form are equivalent, because they have the same behaviour/function. Thus, a canonical form defines the minimum function or a set of functions/capabilities of a synthetic device.

In embodiments, the at least one processor is configured to implement an object capability model which defines the security permissions associated with each canonical and synthetic device. Preferably, the at least one processor is further configured to control the physical device(s) by applying the permissions set by the object capability model.

Preferably, the object capability model is a computer security model defining the permissions granted to the user, each canonical device and each synthetic device to access the functions and data of the other canonical, synthetic and physical devices. The model is defined with software or computer code and may be implemented by the system. The model may be used to grant access to only some of the available functions or data, for example the functions may be limited to monitoring only. Different objects (devices) may have different levels of permissions, i.e. a different set of limited functions. For additional security, the object capability model may use a caretaker object to store and define the permissions for each user, canonical device and/or synthetic device in relation to each other canonical, synthetic or physical device. The model can destroy one or more of the caretaker objects as and when necessary, which removes access by the user, canonical device and/or synthetic device to the other device associated with the caretaker object. This may be particularly useful for consumer devices for which it is difficult to grant access to the device and/or data produced by the device. The object capability model may be used to set permissions with reference to a canonical device, such that a party may set the permissions for all physical devices that are represented by the same canonical device (i.e. which follow the same canonical form) at once. This enables permissions to be set quickly for large numbers of devices.

In embodiments, the object capability model grants permissions to the user and to each canonical device and each synthetic device for a specified time period, wherein expiration of the time period automatically revokes the permissions. The specified time period may be for particular days of the week, particular hours of the day or for particular lengths of time (e.g. one month, one day, etc.). The specified time period may be different for each device and/or user. The specified time period may be for the time a particular event lasts. For example, it may be possible to grant access to a security firm to the video feed of a security camera only when a burglar alarm in a property has been triggered, so that they can assess the situation. The permissions may be revoked as soon as the burglar alarm has been turned off or reset, for privacy.

In embodiments, the user is a third party, and the object capability model is configured to grant permissions to the third party which limit the third party's access to the functions and data produced by the canonical, synthetic and physical devices.

As mentioned above, a physical device may be a relatively simple device with a single function (e.g. a printer that is only able to print). The physical device may be associated with a canonical device, which corresponds to a pre-defined canonical form that defines the behaviour/capability of the physical device. Additionally or alternatively, a physical device may be more complex and have two or more functions (e.g. a machine that is able to print, copy and scan). A complex physical device may therefore be associated with one or more canonical devices, where each canonical device corresponds to a canonical form that defines one of the functions of the physical device. In embodiments, the system may comprise more than one physical device, and each physical device may be associated with at least one canonical device.

Thus, in embodiments, the precedent module may comprise a database storing a plurality of pre-defined canonical devices, wherein each canonical device corresponds to one of a plurality of pre-defined canonical forms, each canonical form defining a set of minimum capabilities for a type of physical device, wherein the at least one physical device is associated with at least one canonical device which matches at least some of the capabilities of the physical device. Preferably, the at least one processor is configured to: associate the at least one physical device to one of the pre-defined canonical devices by comparing the capabilities of the physical device with the set of minimum capabilities defined by one of the canonical forms, and select the canonical device corresponding to the canonical form which matches the capabilities of the compared physical device.

In embodiments, the system may further comprise a user interface to enable a user to monitor and/or control the at least one physical device. The user interface may be a graphical user interface provided on a computing device or mobile computing device. Additionally or alternatively, the user interface may be a web-based user interface, and/or a cloud-based user interface.

In embodiments where the system comprises a plurality of physical devices, the plurality of physical devices may be located at one or more locations. The one or more locations may include a home or an office (i.e. a fixed or static place) and/or a mobile location (i.e. a moving or changeable place). The mobile location may be a vehicle (e.g. a car, a boat, a bicycle). In embodiments, the plurality of physical devices comprises a mobile device or a wearable device, located with or on a human or animal (e.g. wearable technology, health/fitness monitors, smart pet chips, baby monitoring devices etc).

In embodiments, the system further comprises a networking abstraction module configured to: communicate with the physical device(s) by one or more networking protocols; and remove details of the one or more networking protocols from the system. The networking abstraction module simplifies the way in which the system components communicate with and receive data from the physical device(s), as the components do not individually need to translate between communication protocols.

In embodiments, the system further comprises a hub device to which the at least one physical device (or the plurality of physical devices) is coupled for interconnection within the system, and wherein the hub device comprises the networking abstraction module. Preferably, the hub device is a hardware device coupled to a wired or wireless internet router. In embodiments where the system comprises a plurality of physical devices, the hub device may be located in a location which is proximate most of the plurality of physical devices and may thus be considered as a local hub device. For example, where the plurality of devices are generally located in a user's home, the hub device may be an in-home hub device.

Additionally or alternatively, the functionalities of the system may be distributed between a hub and a remote server, or provided entirely via a remote-only platform. A distributed or remote-only platform may enable physical devices which are located in a mobile location (e.g. in a vehicle, or with/on a person), or which are mobile physical devices, to connect to the system as they may not need to connect via a physical hardware hub located in a specific place.

The precedent module may be located in the local hub or in a remote server. Similarly, the archetype module may be located in the local hub or in a remote server. The database for the object capability model may be stored in the local hub or in a remote server. The precedent module, the archetype module and the database may be located together in the local hub, together in the remote server or split across the local hub and the remote server.

In embodiments, the at least one processor comprises a first processor which is located in the precedent module and which associates the at least one physical device (or each of the physical devices) to a canonical device. The at least one processor may further comprise a second processor which is located in a remote server and which is configured to control the at least one (or each) physical device.

The or each processor may be implemented in any known suitable hardware such as a microprocessor, a Digital Signal Processing (DSP) chip, an Application Specific Integrated Circuit (ASIC), Field Programmable Gate Arrays (FPGAs), etc. The or each processor may include one or more processing cores with each core configured to perform independently. The or each processor may have connectivity to a bus to execute instructions and process information stored in, for example, a memory.

In particular embodiments, the physical devices include a thermostat, a boiler and a smartphone. The physical devices may be used to provide a synthetic device that is an occupancy detector composed of a first canonical device associated with and which receives data from the thermostat, a second canonical device associated with and which receives data from the boiler and a third canonical device associated with and which receives data from the smartphone, and at least one rule to define when the property is occupied based on data from the canonical device, wherein the at least one processor is configured to process data received from the first, second and third canonical devices in conjunction with the at least one rule of the synthetic device to determine if the property is occupied by a human. In this embodiment, the at least one rule may be that the property is occupied when the data from the canonical device associated with the thermostat indicates that the temperature in a property has been set for human comfort, the data from the canonical device associated with the boiler indicates that the boiler is firing, and the data from the canonical device associated with the smart phone indicates that there is a smartphone signal in the property. If the at least one processor determines that the property is unoccupied and the boiler is firing, the at least one processor may send an alert to the user interface to prompt the user to remotely switch-off the boiler or remotely lower the temperature of the thermostat.

In embodiments, the object capability model grants permissions to a third party to monitor the operation of the boiler. For example, the third party may be a boiler manufacturer or gas supplier who may wish to check that the boiler is operating as expected, so that if it is not, they can alert the boiler owner to schedule a repair. The object capability model may also grant permissions to occupants of the property to control the thermostat, so that they may set the thermostat to the temperature they desire, and to program the boiler to turn on and heat the home at the desired times. The third party gas supplier may not be provided with the same permission, to prevent a third party from tampering with the thermostat (maliciously or otherwise) to turn the heating on/off contrary to the occupants' own settings.

The processor is preferably configured to control each physical device in response to a user input on the user interface.

In a related aspect of the invention, there is provided a method for interconnecting and coordinating a plurality of devices, services and applications in a single platform, the method comprising: receiving a request to connect to the platform from a physical device, the request including identity data to identify the physical device; obtaining a device driver corresponding to the identified physical device; selecting one of a plurality of pre-defined canonical forms, each canonical form defining a set of minimum capabilities for a type of physical device; comparing the capabilities of the physical device with the set of minimum capabilities of the selected canonical form to determine if at least some of the capabilities of the physical device match those of the canonical form; wherein if the capabilities match, the method further comprises: selecting a canonical device corresponding to the matched canonical form, and associating the canonical device with the physical device; and monitoring the physical device via the associated canonical device by permissions defined by an object capability model.

The invention also provides a carrier carrying processor control code to, when running, implement any of the above methods, in particular on a non-transitory data carrier—such as a disk, microprocessor, CD- or DVD-ROM, programmed memory such as read-only memory (Firmware), or on a data carrier such as an optical or electrical signal carrier. Code (and/or data) to implement embodiments of the invention may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language). As the skilled person will appreciate such code and/or data may be distributed between a plurality of coupled components in communication with one another. The invention may comprise a controller which includes a microprocessor, working memory and program memory coupled to one or more of the components of the system.

BRIEF DESCRIPTION OF THE DRAWINGS

The invention is diagrammatically illustrated, by way of example, in the accompanying drawings, in which.

DETAILED DESCRIPTION

Glossary of Terms

Figure 1:
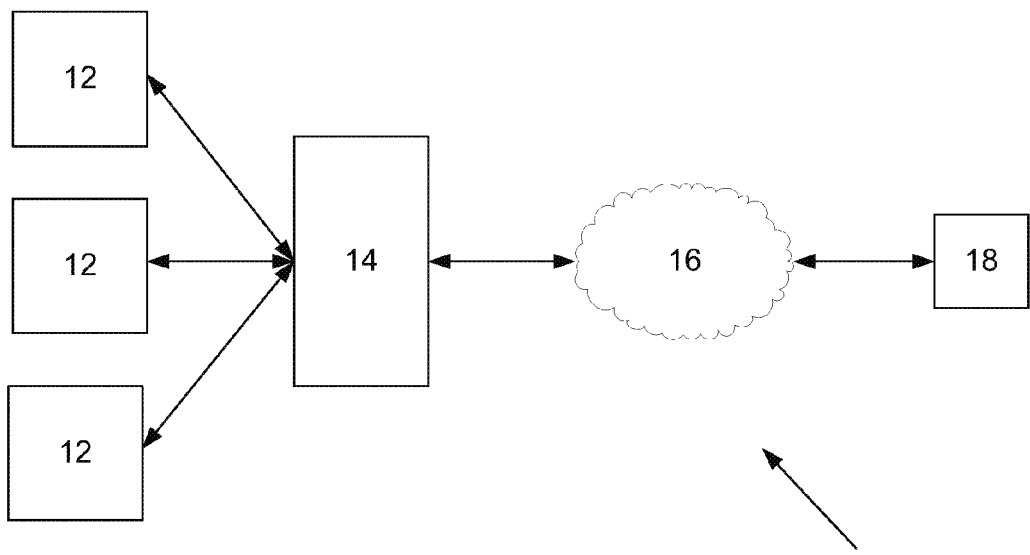
FIG. 1 illustrates a prior art system of connecting physical devices.

App=a shortening of the term "application software", and refers to one or more computer programs designed to carry out operations for a specific application. The term is used throughout the description to mean application software and includes "mobile apps", i.e. computer programs designed to run on smartphones, tablets and other mobile devices.

Gateway=a network node, telecommunications router or proxy server that is able to route between networks that may use different communication protocols. The gateway may include means to translate/map between different protocols in order to enable data sent over a network using a particular communication protocol to be converted into a different data format suitable for transmission over a network that uses a different communication protocol. The term also covers a computer or computer program that is configured to perform the tasks of a gateway. The term "gateway" is used interchangeably with the term "hub" throughout the description, where the hub is a piece of hardware that may comprise a computer program/software that performs the task of a gateway.

The cloud=a network of remote severs accessible via the internet and used to store, manage and process data in place of local severs/computers. The term is used interchangeably with "remote sever" in the description because features of the invention which are described as being in or accessible via "the cloud" could equally be in a server at a remote location (remote from the location of the physical devices).

A device=this is broadly used in the computer science sense to mean an entity that has a state, that can accept commands and that can emit events as it senses changes in the real world or its own condition.

Physical device=this is broadly used to mean a device that has been implemented in a piece of hardware, and may act as an actuator (to change the state of the surrounding environment), or a sensor (to detect the state of the surrounding environment). The term is also used to refer to consumer electronic goods and electronic appliances which have the capability to communicate with a hub/gateway. The devices are not limited to those goods which have been modified to include an identifier. Rather, the devices can be any goods which have the ability to communicate via the following example protocols: Wi-Fi, ZigBee, ZWave, IPv4, IPv6 etc.

Canonical form=this is broadly used in the computer science sense to mean a 'normal', 'canonical' or 'standard' way of representing an object that has a unique representation. The reduction to a canonical representation means that two objects (e.g. physical devices) can be deemed to be equivalent if their canonical representations are tested and determined to be equivalent. The canonical form may represent a behaviour associated with a device, and may include a series of (automatable) tests to determine if a device behaves as expected. A canonical form therefore enables a first level of device abstraction, because it represents a behaviour of a device but does not include any details on how the behaviour is achieved.

Canonical device=software that represents a virtual device that complies with a particular canonical form. All canonical devices that follow the same canonical form are equivalent, because they have the same behaviour/function. Thus, a canonical device defines the minimum function or a set of functions/capabilities of a real, physical device with which it is associated. The canonical device is an abstracted version of a real, physical device because it represents a behaviour (or set of behaviours) of a device but does not include any details on how the behaviour is achieved. The canonical device has a state or set of states, can accept commands and can emit events as it senses changes in its state.

Synthetic device=software that embodies intelligence for devices (real or synthetic), that complies with a particular canonical form. Synthetic devices are composable because the grammar (in programing terms) used to exchange information and control between them is orthogonal to the functionality of an individual device's functionality or behaviour. More specifically, the term is used to mean a virtual device which may be formed by combining one or more canonical devices with a proposition/rule that defines how the synthetic device behaves/functions. The synthetic device provides a second level of device abstraction. All synthetic devices which follow the same canonical form are equivalent, because they have the same behaviour/function. Thus, a canonical form defines the minimum function or a set of functions/capabilities of a synthetic device.

Device abstraction=broadly, the term is used to mean that (physical) devices may be defined by a canonical form, and those which are defined by the same canonical form are therefore deemed equivalent. Device abstraction means all physical devices defined by the same canonical form behave as defined by that canonical form, even if the physical devices themselves vary in how the behaviour is achieved/implemented.

Abstraction module=a module for hiding the implementation details of a device (physical or canonical) such that the device is described by a behaviour or a set of functionalities. The term may be used interchangeably with "abstraction level/layer".

Precedent module=a module which contains canonical devices and so hides the technical specifications of a particular physical device, by reducing the physical device to an abstract/virtual canonical device defined by a canonical form. The term is used interchangeably with "first device abstraction module", because the precedent module provides a first level of abstraction from the physical devices. The term may also be used interchangeably with "first device abstraction level/layer". The module may be a hardware or software module, and may be provided locally for each connected environment or in a remote location.

Archetype module=a module which contains synthetic devices. The term is used interchangeably with "second device abstraction module" and may be used interchangeably with "second device abstraction level/layer". The module may be a hardware or software module, and may be provided locally for each connected environment or in a remote location.

Object capability model=a software-based computer security model that attaches authorisations or permissions ("capabilities") to entities that wish to access a service or data/information from an object. A capability specifies what services/data an entity can access from or with respect to an object. The model uses the capabilities as the primary means of providing authority and controlling access to the objects (or their services/data). In context, the model is used to define the permissions that different parties (users/devices) may have for devices (physical, canonical and/or synthetic) in the system, such that access to the controls or data associated with a device is controlled.

Location=this refers to the environment containing physical devices that are interconnected and coordinated by the system. The environment/location includes static or fixed locations (e.g. a home, a room or rooms within a home, an office, a workplace etc.) and mobile locations (e.g. in or on a vehicle). If the physical device is a mobile device or a wearable device (e.g. a smart watch, a health monitor, smart clothing, a fitness/activity monitor, a pet monitor etc.), the location may also be with or on a human or animal.

Processor=a generic term for implementing the described processes via software, hardware, firmware or a combination of software and/or firmware and/or hardware. The processor may be implemented in any known suitable hardware such as a microprocessor, a Digital Signal Processing (DSP) chip, an Application Specific Integrated Circuit (ASIC), Field Programmable Gate Arrays (FPGAs), etc. The processor may include one or more processing cores with each core configured to perform independently. The processor has connectivity to a bus to execute instructions and process information stored in, for example, a memory.

Description

FIG. 1 illustrates a prior art system 10 for connecting and automating physical devices and appliances in a home or office via a single platform. The system may include a user device such as a smartphone 18 that may be used by a user to monitor and/or control the physical devices remotely. The monitoring and controlling may be achieved via a user interface running on, or accessible by, the smartphone. The system comprises one or more physical devices 12, which may be for example, consumer electronic goods, smart meters, smart sensors, home monitoring devices, lighting devices, heating devices etc. The one or more physical devices 12 may therefore be of different types and may be made by different manufacturers. The physical devices 12 and user device 18 used to monitor/control the physical devices may also be made by different manufacturers, adding a further level of complexity into the communication and data transfer between the physical devices and user device.

The illustrated system enables two-way physical device control through an in-home hub 14. All physical devices connected into the system may be connected to the hub device 14 (a hardware component) such that the physical devices in the home/office can connect to the internet, to services accessible via the cloud, or to other devices via the internet. This connectivity is generally enabled by the use of a gateway (not shown) that is able to route data between networks that use different communication protocols. The gateway may be accessible via the hub, or the hub 14 itself may contain a computer program or software that performs the task of a gateway. The gateway translates between internet protocols and different communication protocols (e.g. the ZigBee® protocol used to create personal area networks).

The hub accesses the internet by, for example, connecting to a broadband internet router (and thus, provides a way for the physical devices to connect to the internet). The physical devices 12 are thereby connected to a cloud-based platform 16 by a wired or wireless connection (via the hub), and the platform 16 links devices, applications and analytics software together. The platform 16 may enable devices and data to be accessible via a single user interface. The platform 16 may include data analytics software which turns 'dumb' devices into intelligent, smart devices. Users may use their smartphone 18 (e.g. via a software application) to monitor/control their in-home physical devices 12. For example, consumers may use an app to remotely turn off a physical heating device after they have left their home, so that energy is not wasted on heating an empty home. The platform thereby provides the user with a convenient way to operate the physical device without having to be physically near it.

The hub 14 may also act locally to apply rules or controls to physical devices 12 within the home, even if the home is offline. The functions performed by an in-home hub typically mean the hub has a sufficiently small footprint such that it can even be embedded within existing gateway devices, such as broadband routers and media set-top boxes. However, as physical devices and home networks grow in capability, physical devices may preferably connect to the internet directly, without the need for a hub. The connection of multiple physical devices into the system may be achieved by running device rules in the cloud. Cloud-based computing is advantageous because it is dynamically scalable, by providing services over the internet. A user is able to access the services without any knowledge of the technical aspects of the cloud. For example, a user may access a service via their web browser, where the service is provided by a cloud-based service, and both the software and any data used to provide the web service are stored in the cloud remote from the user. However, the platform 16 of the prior art system may not be able to cope with requests to connect received from multiple (e.g. hundreds of thousands to tens of millions) different physical devices that use multiple different communication protocols and have different technical specifications. Different versions of the same physical device may be configured differently, such that the platform needs to be able to communicate with them in different ways (even if only slightly different). By way of example only, the platform may need to distinguish between smartphones made by different manufacturers (e.g. BlackBerry®, Apple®, Samsung® etc.), different models of smartphone by each manufacturer (e.g. BlackBerry Z10®, BlackBerry Q10® etc.), and different versions of each model of smartphone (e.g. 2G, 3G, 4G versions), so that it can communicate with the physical device correctly. The platform 16 may need to be regularly updated to keep track of different types of physical device, different models and versions, which is inefficient and time consuming. Similarly, the platform may need to distinguish between thermostats made by different manufacturers (e.g. Honeywell, Drayton, Salus, etc).

A further disadvantage of this prior art system is the difficulty of adapting the system to connect a new physical device, which may have a different technical specification to any of the existing physical devices connected to the system. For example, the existing physical devices in the system may include a temperature sensor or thermostat which senses temperature in a property in degrees Celsius (° C.). Adapting the system to connect a physical temperature sensor or thermostat which senses temperature in degrees Fahrenheit (° F.) may require changes to be made at each level of the system to ensure that the system components are able to communicate with each other correctly and to ensure the new unit of measurement is understood by the system components. This relatively simple change may require significant man-hours to implement, since the change may require engineers and software developers to adapt the protocols and computer code at each level of the system.

Figure 2:
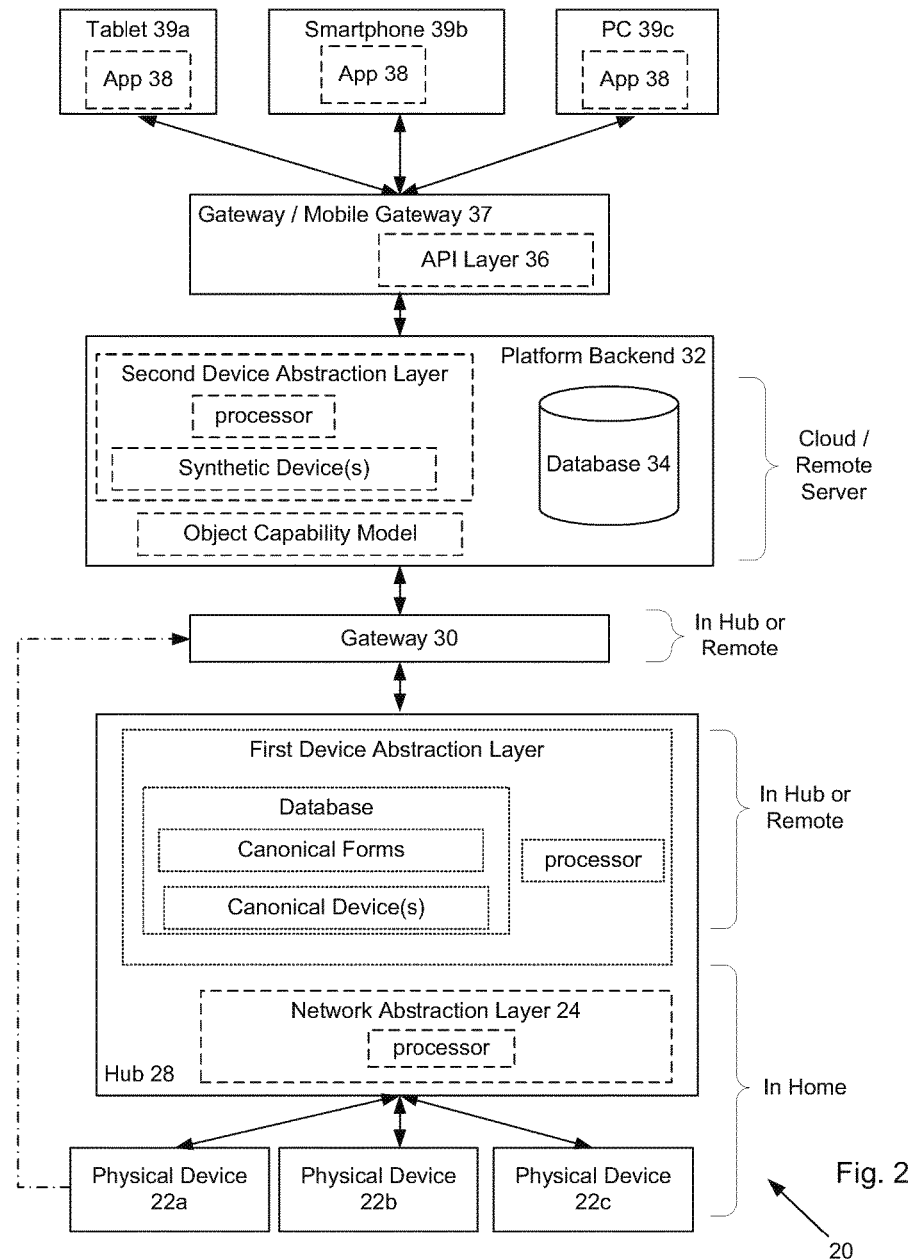
FIG. 2 shows a block diagram representing a system of connecting physical devices according to an embodiment of the present invention.

FIG. 2 illustrates a system for connecting physical devices to create a "connected environment" according to an embodiment of the present invention. The system 20 manages the complexity of multiple physical devices, multiple physical device types and multiple network protocols by removing all knowledge from the platform to simplify the system. In the system 20, a platform receives 'simple' data from the physical devices 22*a, b, c* and does not need to understand anything about the physical device from which the data originates. Similarly, the platform does not need to know anything about the user-side devices 39*a, b, c* and/or app(s) 38 which may be used to monitor/control the device (s) 22. It will be appreciated that three physical devices and user side devices is simply an arbitrary choice to facilitate illustration. Any number of devices may be interconnected in the system.

A user may monitor/control physical devices 22*a,b,c* using a user-side control device such as a tablet computer 39*a*, a smartphone 39*b* or a PC or laptop 39*c*, or any other suitable means, and in embodiments, the monitoring/controlling is performed via a user interface such as an app 38 running on, or accessible via, the control device. The user interface may alternatively be provided elsewhere and accessible via the control device (e.g. via a web browser running on the control device). The user-side control devices are connected to a gateway 37 whereby they may be interconnected with each other and/or with the mobile devices within the system. Similarly, the mobile control devices (such as the smartphone 39*b*) are connected to a mobile gateway to be interconnected within the system 20 using the mobile communications network. The system 20 comprises a platform backend 32 which may be able to communicate with the control devices 39*a, b, c* and/or the app(s) 38 accessible via the control devices, via an application programming interface (API) layer 36. The API layer specifies how software components of the apps 38 and the platform communicate with each other, and enables data to be shared between otherwise distinct applications. The API layer may be coupled to the gateway/mobile gateway 37 or be provided as a separate, distinct module within the system between the platform backend 32 and the gateway 37.

In the system of FIG. 2, specific knowledge about the implementation details of the control devices and the physical devices 22*a, b, c* is removed from the system, which simplifies the creation and management of the system. This is achieved by providing two layers of abstraction between the physical devices 22*a, b, c*, and the control devices 39*a*, b, c or app 38 used to monitor/control the physical devices 22a, b, c, preferably in combination with an object capability model. The platform used to implement the system (i.e. software or hardware architecture) may be provided in a local hub device 28 or in the cloud/remote server. Additionally or alternatively, the functionalities of the platform may be distributed between the hub and the cloud/remote server(s). Physical devices may connect into the system through the hub, or directly, as explained in more detail below.

Broadly speaking, and as explained in the glossary section, an abstraction layer or level is a technique used in computer science to hide the implementation details of a device so that the device (e.g. a physical device) is described by its behaviour, or a set of behaviours/functionalities. The abstraction technique can therefore identify a device as being a particular type based on its behaviour, and this enables other components in a system to communicate with the device without needing to know any of the specific details (e.g. technical specification, model number, version number) of the device. Many modern operating systems use layers of abstraction or a hierarchy of abstraction layers. For example, in order to read and write to a device at application level, a program may call a function to open the device (e.g. a real device such as a terminal, or a virtual device such as a network port or file). The device's physical characteristics are mediated by the operating system, and the operating system presents an abstract interface that allows a programmer to read and write bytes from/to the device. The operating system then performs the actual transformation needed to read and write the stream of bytes to the device. Thus, in this example, there is one layer of abstraction between the device and the operating system.

A first abstraction layer or module (also called a "precedent module") is used to abstract the physical devices which are interconnected within the system. In embodiments, the system may comprise a database, storage device or other suitable storage means, which contains at least one canonical form (explained in more detail below). Additionally or alternatively, the system may comprise a plurality of canonical forms. In the embodiment shown in FIG. 2, a database comprising canonical forms is shown as being part of the first abstraction layer within the hub. In this case, one or more physical devices coupled to a first hub may be able to interconnect with one or more physical devices coupled to a second hub, without requiring a platform backend 32, since the canonical forms are stored within the first abstraction layer within the first and second hubs. However, the list of canonical forms may be centrally stored within the platform backend 32, within database 34 located elsewhere in the system, or elsewhere in the cloud or a remote server. In this case, the first abstraction layer may retrieve and/or store instances (local copies) of the remotely-stored canonical forms within the first abstraction layer as required. The canonical form(s) may be used by the first abstraction layer to strip a physical device (or each physical device, if there are multiple physical devices) of their implementation details so that the or each of the physical devices 22a, b, c connected to the system are defined only by their behaviours/functionalities.

As explained in the glossary, a canonical form is a representation of an object (e.g. a physical device) in terms of its behaviour (or a set of minimum behaviours, or a set of functionalities), and includes a series of automatable tests to determine if an object complies with the behaviour(s) of the canonical form. For example, a canonical form may define a particular type of object's behaviour as "measuring and adjusting temperature". A processor may be configured to test a particular physical device against a canonical form to determine whether the physical device complies with the definition of the canonical form. In the example, the processor may be configured to check if the physical device can (i) measure temperature, and (ii) adjust temperature. A physical digital thermometer or temperature sensor can measure temperature but may not be able to adjust temperature and thus, the processor would determine that the physical device does not pass the test of that particular canonical form. A thermostat may pass the test because it can both sense and adjust temperature.

Additionally or alternatively, a physical object may have multiple different behaviours and these may be described by one or more canonical forms. For example, office printers are typically also able to scan documents and photocopy documents. Thus, the physical printer behaviours may be described by a canonical form which represents "printing", another canonical form which represents "scanning" and a third which represents "photocopying". Thus, at least some of the behaviours of a physical device may be mapped to a single canonical form, such that the physical device is described by more than one canonical form.

The processor (or other system component) may be configured to provide a local instance of a canonical device (i.e. a virtual device defined by some software), which represents the physical device in the system, and which has the behaviours defined by a canonical form. For complicated physical devices with different behaviours, a canonical device may be provided for each canonical form which describes the physical device behaviours. The canonical device has a state or set of states, can accept commands and can emit events as it senses changes in its state. The canonical device is preferably pre-defined in the system, and a database or store of canonical devices may be provided in the cloud/remote server. The first device abstraction module processor may retrieve a copy of the canonical device from the central database/store of canonical devices, and store a local copy within the first device abstraction module, for future use. This may be preferred if the first abstraction module is provided within the hub 28, because it can be used to store the canonical devices for all physical devices connected to it, to speed up communication with and data transfer between the hub and connected physical devices. In the example scenario, the processor may provide a canonical thermostat to the first device abstraction module, which represents a physical thermostat and has the behaviours defined by the relevant canonical form. The canonical thermostat may be used by the system to monitor and/or control the associated physical thermostat. Thus, the monitoring/controlling is simplified because the system does not need to know anything about the brand or version of the physical thermostat in order to interact with the physical thermostat. The system only needs to know that the physical thermostat has certain pre-defined behaviours.

Canonical forms may preferably define device behaviours using a particular system of units of measurement, such as the International System of Units (or SI units). For example, canonical forms associated with measuring temperature may specify that the temperature is measured in degrees Celsius (° C.). Using a system standard or common system of units of measurement within the system may enable physical devices to be monitored and/or controlled without needing to know the precise unit of measurement used in a physical device. A device driver associated with a physical device (explained in more detail below), may be configured such that it can receive commands using a system standard unit of measurement and implement them in the physical device accordingly. The device driver may be able to map the system standard unit of measurement to the measurement used by the physical device (e.g. from ° C. to ° F.), such that the platform or system itself does not need to know what units of measurement are used by the physical device(s).

In other words, a behaviour (or set of behaviours) of a canonical form is a specification provided as a series of automatable tests for how a device should behave. The scope of a canonical form would include the 'normal' behaviour of the device and how it can be monitored and managed so that external entities (usually synthetic devices, as explained below) can understand the state of any device that conforms to a specific canonical form. A canonical form may be defined for physical, canonical and/or synthetic devices. In the above example, different brands of physical thermostat will be follow the same canonical form(s) if they can both measure and control temperature. Thus, the system can use this physical device abstraction to monitor and manage all physical thermostats that follow the same canonical form(s) in the same way. This is much simpler than having to adapt the system for all variations between physical devices. Furthermore, the canonical forms may enable tests to be performed on any system components that interact with a device (physical or canonical, or synthetic), to check that the components work correctly when interacting with the device. Tests can be performed individually or in concert, thus making it possible to test large numbers of combinations of instances of device types in software, without the time and resource constraints of setting up a real environment with physical devices. The canonical form enables 'testing down' to confirm that a new physical device supports the abstraction and 'testing upwards' to confirm that anything interacting with a (canonical) device supporting a specific canonical form behave as expected.

Turning back to FIG. 2, the system 20 provides a platform to connect together consumer electronic goods (i.e. the physical devices 22a, b, c) and control devices such as smartphones, tablets and PCs (and/or apps 38 running on the control devices). Although FIG. 2 shows multiple physical devices 22, it will be appreciated that at least one physical device may be connected into the system for control/monitoring. The platform used to implement the system (i.e. software or hardware architecture) may be provided in a local (e.g. in-home) hub device 28, or in the cloud/remote server(s). Additionally or alternatively, the functionalities of the platform may be distributed between the hub 28 and the cloud/remote server, which enables greater flexibility in the hardware hub itself. (If the platform is provided in the cloud/remote server(s), it may remove the need for physical devices 22a, b, c to connect to the platform via a hub. As shown in FIG. 2, a physical device 22a, b, c may be able to connect to the platform directly via the gateway 30. A distributed or remote-only platform may enable physical devices which are located in a mobile location (e.g. in a vehicle, or with/on a person), or which are mobile physical devices, to connect to the system as they may not need to connect via a physical hardware hub 28 located in a specific place. For example, a physical device may be a sensor (e.g. an accelerometer, gyroscope, barometer, etc.) within a smartphone. In embodiments, the physical sensor may be connected into the system for control/monitoring via the internet capability of the smartphone itself, rather than via a hub device.

As shown in FIG. 2, the hub 28 sits between the physical device(s) 22a, b, c and the cloud/remote server(s). The hub 28 enables the typically low-power physical devices in the home/office to connect with the platform, by translating between internet protocols and multiple different communication protocols used by the physical devices. Additionally, the hub 28 may connect to simple devices which do not have a means to (or a need to) connect to the internet. The simple physical devices may be, for example, a kettle that is voice-activated, or a fitness tracker which itself does not have capability to connect to the internet, but does so by coupling to a 'base station' that can connect to the internet. The simple physical devices may be controlled or monitored by the system 20 once they are connected into the system, but ordinarily do not require connection to the internet to enable them to be operated. Thus, the hub 28 may be configurable to provide the function of such a 'base station', to enable data received from the fitness tracker to be uploaded to a website etc. The hub therefore may be able to replace the need for multiple 'base stations' for different physical devices, which could facilitate the creation of a connected environment. In another example, the efficiency or energy usage of a simple physical device may be monitored by the hub (so that a user is informed if the physical device is not operating correctly or as efficiently as possible, for instance), but it may not be possible to control the simple physical device itself using the platform/system. In other words, data may flow in one direction for such simple physical devices connected to the system, i.e. from the device to the system only. For other physical devices, data may flow in both directions.

The hub 28 may comprise at least a networking abstraction layer or module 24, which enables one or more physical devices of any type to connect to the hub 28 using any connection means (e.g. the ZigBee communication protocol, the Z-wave wireless communications protocol for home automation, IPv4 and IPv6 internet protocols, application protocol stacks, etc.) without the rest of the system needing to know the exact communication means a physical device is using to connect to the hub. Additionally or alternatively, the networking abstraction layer 24 may be provided as a separate module elsewhere in the system, between the one or more physical devices and the gateway 30, particularly for those physical devices which are mobile and not affixed or permanently located in one position (e.g. wearable technologies). Wherever it is provided within the system, the networking abstraction layer enables the one or more physical devices 22a, b, c to connect to the platform, without the need for the physical devices to use the same communication protocols in order to connect into the system. This overcomes the need for manufacturers of devices to adopt a single common communication protocol in their devices, and thus, the networking abstraction layer 24 provides the radio or protocol stacks that enable the connectivity of devices in the home/office. Furthermore, system components can receive data from, and send instructions/data to, a physical device without needing to translate between different communication formats/protocols. This may enable the monitoring and controlling of devices by the system to be simplified.

Figure 5A:
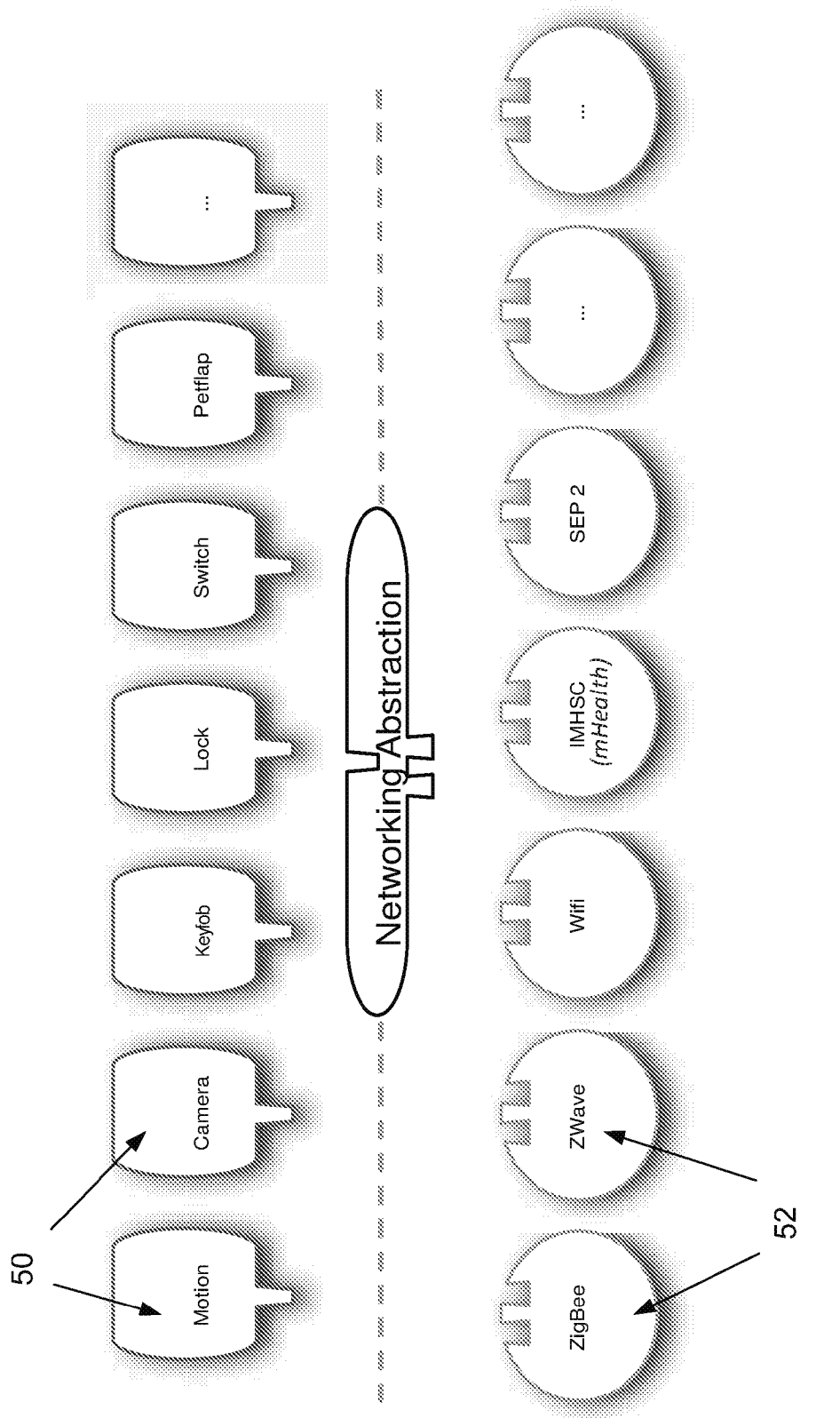
FIG. 5a shows a schematic of the network abstraction used to connect physical devices in the system of FIG. 2.

FIG. 5a shows a schematic of the network abstraction (and device abstraction) used to connect physical devices to the system of FIG. 2. Physical devices may communicate via different communication protocols 52 such as ZigBee, Wi-Fi, etc. The networking abstraction layer is provided between the physical devices and the canonical devices 50 which are used to represent the physical devices in the system. Examples of canonical devices 50 shown here are motion sensors, cameras, locks, pet doors, etc. Protocol abstraction at the network layer enables devices of different types and which use different communication protocols 52 to connect into the system. (There are currently 70 to 100 different network protocols). The networking abstraction layer translates data received by a physical device into a particular format suitable for the canonical devices 50/the platform. Similarly, any control instructions provided by the system with respect to the canonical devices 50 are forwarded to the corresponding physical devices via the networking abstraction layer, which formats the instructions/data into the format suitable for the physical devices. Thus, data can flow between the system/canonical devices and the physical devices without any need to know which communication protocols the system or physical devices are using. Advantageously, the networking abstraction avoids the combinatorial impact of different physical device types and network protocols 52. The functionality of a physical device is essentially de-coupled from the connectivity of the physical device. The device abstraction is achieved by abstracting real, physical devices as canonical devices 50 with state tables (as explained earlier), thereby enabling new physical devices to be incorporated into the system more readily, and enabling more complex "fusion" propositions to be written.

Returning to FIG. 2, the system 20 may comprise a second device abstraction layer/module (also known as an "archetype module"). The second device abstraction module may be provided within the platform backend 32, or alternatively, may be provided in the hub 28, or distributed between the hub and the cloud/remote server. The second device abstraction module may comprise a database, storage, or suitable storage means for storing a plurality of synthetic devices. A synthetic device is a virtual device (piece of software) which embodies intelligence for other devices (physical, canonical or synthetic) that complies with a particular canonical form. Synthetic devices may be formed by combining one or more canonical devices with a proposition/rule that defines how the canonical devices are combined to define the overall behaviour/function of the synthetic device. Synthetic devices may be formed by combining one or more canonical devices with one or more synthetic devices, and/or by combining two or more synthetic devices. All synthetic devices which follow the same canonical form are equivalent, because they have the same behaviour/function. Thus, a canonical form defines the minimum function or a set of functions/capabilities of a synthetic device.

Figure 6:
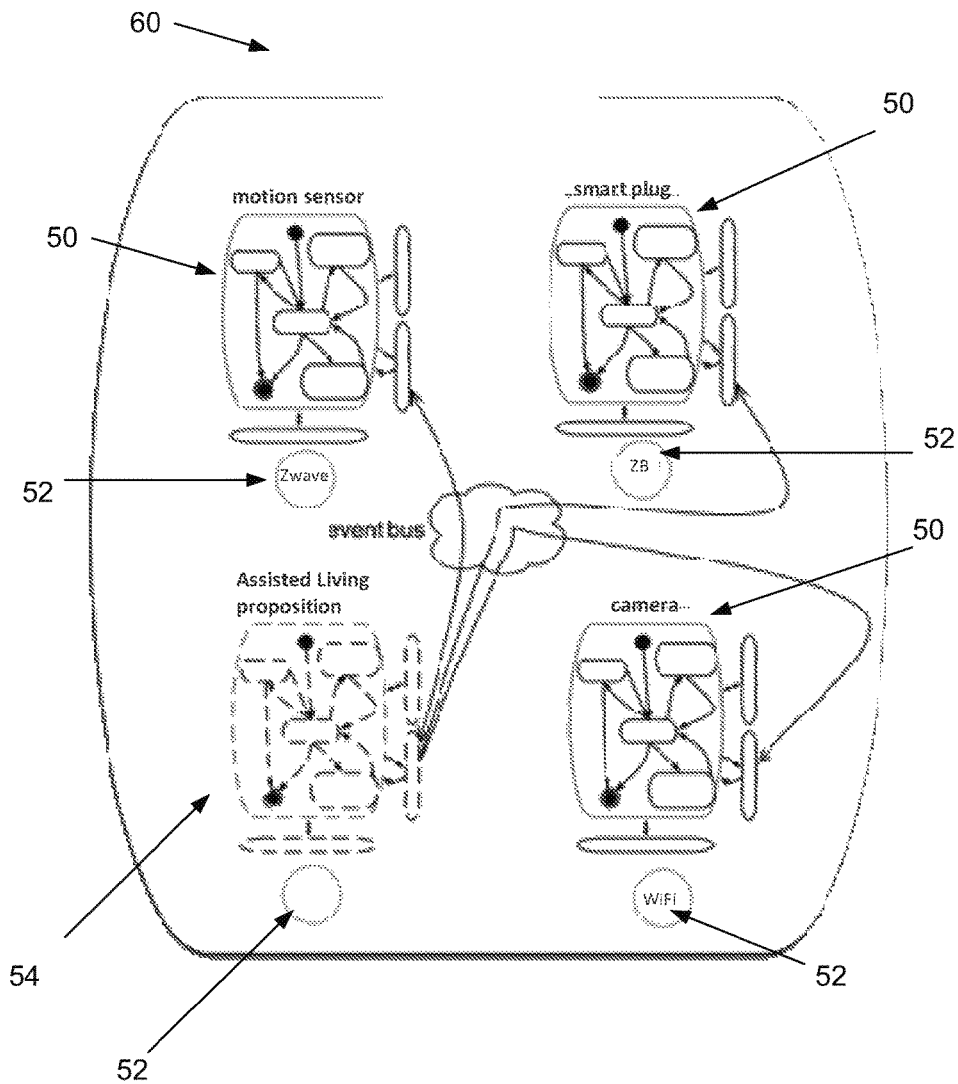
FIG. 6 depicts a schematic of an example of a synthetic device composed of multiple canonical devices.

A user may be able to monitor and/or control a synthetic device via their user-end control device 39*a,b,c* or app 38. Consequently and indirectly, a user may be able to control real, physical devices that underlie the synthetic device. An example of a synthetic device is shown in FIG. 6 and described in more detail below. If the second device abstraction module is provided within a hub, one or more physical devices coupled to a first hub may be able to interconnect with one or more physical devices coupled to a second hub, without requiring a platform backend 32, since the synthetic devices are stored within the second abstraction module within the first and second hubs.

The platform backend 32 may preferably be accessible via the cloud, and may comprise software necessary to link together devices, applications and analytics software. The platform backend 32 may comprise one or more databases or storage mediums 34 to store data analytics software, the at least one pre-defined canonical form, the at least one pre-defined canonical device, and/or (pre-defined) synthetic devices. The backend may comprise servers, processors, software, a hub manager, a rules manager etc. The database(s) may include an SQL or a NoSQL database, depending on how data is stored and managed within the system.

Generally speaking, an object capability model is a software-based computer security model that attaches authorisations or permissions ("capabilities") to entities that wish to access a service or data/information from an object. A capability specifies what services/data an entity can access from or with respect to an object. The model uses the capabilities as the primary means of providing authority and controlling access to the objects (or their services/data). In the context of the present invention, the model may, in embodiments, be used to define the permissions that different parties may have in relation to devices (physical, canonical and/or synthetic) in the system, such that access to the controls or data associated with a device is controlled. More specifically, in an object capability model, if a program has a reference to an operator/method on an object it implicitly has authority to use it. The program cannot see or access things (e.g. data) that it is not allowed to see/access. The model may remove the need to check at runtime whether a particular individual/program is allowed to do something. The object capability model is described in more detail below.

Figure 3:
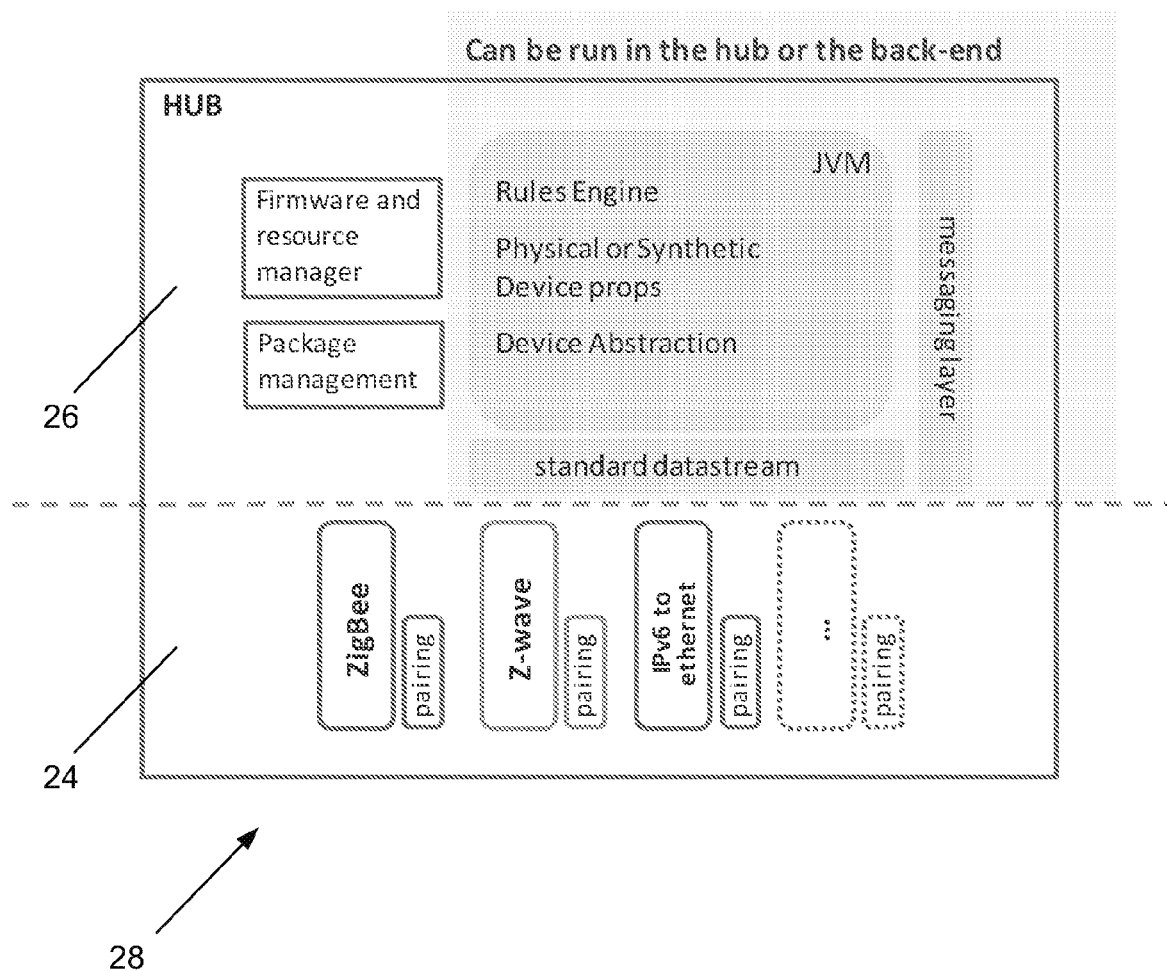
FIG. 3 shows a block diagram of features and capabilities within the hub device shown in FIG. 2.

FIG. 3 shows a schematic of the hub 28 of FIG. 2. As previously mentioned, the hub 28 may comprise a networking abstraction module 24 to remove the specific details of the communication protocols used by the one or more physical devices connected to the hub 28. This enables other system components to communicate with the physical devices without needing to format data received from and data sent to the physical devices in specific (and different) formats for each protocol. The translation is performed by the networking abstraction module 24. The hub 28 may also comprise processors, memory, non-volatile memory, and storage means. The hub 28 may further comprise firmware, to provide the control program(s) for the hub, and a resource manager(s), to manage and prioritise memory and processor usage in the hub on a per application basis.

As shown in FIG. 3, the hub 28 may also comprise a number of features which in embodiments may be provided in the platform backend:

a Java Virtual Machine (JVM), a process virtual machine that can interpret Java code for the hub's processor, so that the processor can interpret any instructions provided in the Java programming language. An advantage of using Java is that software can be developed without having to rewrite or recompile the software code for different platforms, as the JVM can interpret the bytecode for the peculiarities of each platform the software is run on. Embodiments of the system distribute intelligence and co-ordination between the connected environment and the platform in such a way that the user is unaware of, and unaffected by, where the computer code is running. This may be achieved by using the same programming language (e.g. the Java® language) for both the hub and the cloud service, and by the abstraction of networks and devices, which together allows application logic to run in-home (i.e. in a fixed local location) or in-cloud without change. This may hugely ease software development and provide a consistent user experience. However, the system is not limited to receiving Java-based instructions only. The system may be configured to work using additional or alternative programming languages that may require additional or alternative virtual machines to carry out the same interpretation function;

a rules engine—this may contain rules or policies specifying actions that the hub 28 may be able to perform with respect to the physical devices. An example rule may be, "given a kettle and an electricity meter are connected to the system, if the kettle is switched on, and if the electricity meter indicates the power drawn is above a threshold level, record the total energy used by the kettle". The rules engine may be provided as the second device abstraction module/layer;

device abstraction modules—one or both of the first and second device abstraction modules;

canonical forms, and/or instances of canonical and synthetic devices, stored within a database or storage means within the hub;

a messaging layer—this may comprise a message bus to transport messages between applications. The messaging layer may use a protocol such as Advanced Message Queuing Protocol (AMQP) to control how messages are transported between a message provider (hub) and a client (a software application running in the cloud/remote server), preferably in combination with message broker software (such as, but not limited to, RabbitMQ) which acts to at least implement the messaging protocol. The messaging layer may enable the hub 28 to communicate with software running in the platform backend 32;

a (standard) datastream—a type of broadband network connection, particularly used in the United Kingdom.

Device Abstraction

Figure 4:
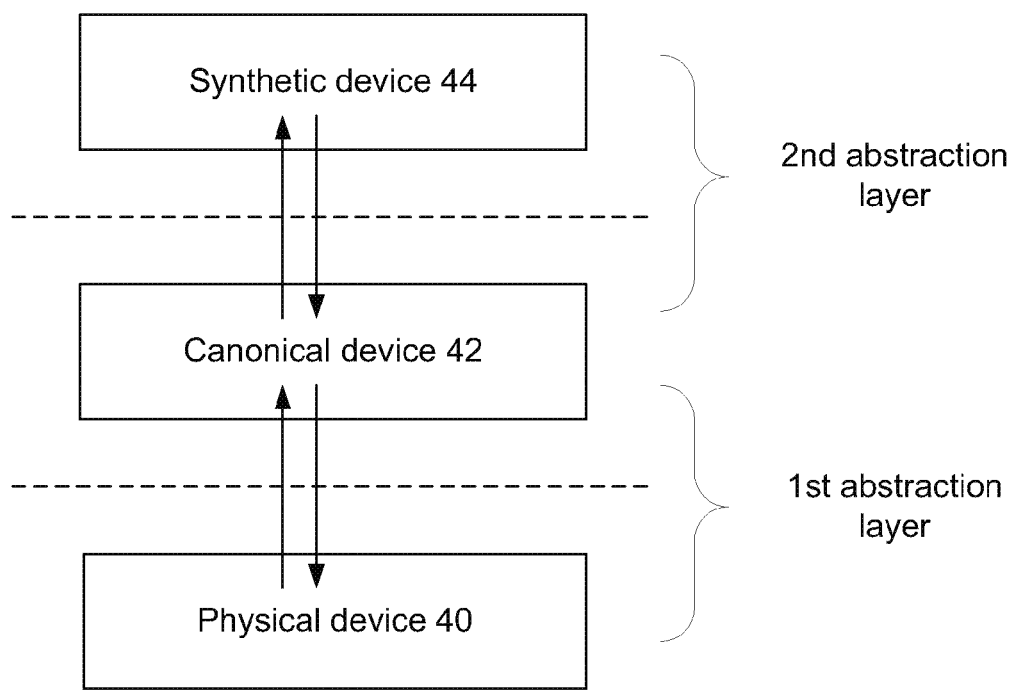
FIG. 4 is a schematic of the device abstraction of the present invention.

As mentioned above, the system does not contain any specific technical details of the one or more physical devices connected to the system, which may enable the creation and management of the platform to be simplified. This is achieved by providing two layers of abstraction between the device and the application used to monitor/control the device, preferably in combination with an object capability model. FIG. 4 shows a schematic of the two layers of abstraction. The first device abstraction layer translates between the real, physical devices 40 and virtual, canonical devices 42. As shown, there is a two way communication between the physical and canonical devices. For example, data may be sent from the physical devices to the canonical devices and control commands from the canonical devices to the physical devices.

The first device abstraction layer may be provided either in the hub or in the cloud. The canonical devices 42 define the behaviours of the real, physical devices 40 with which they are associated. The canonical devices 42 have a state or set of states (e.g. "on", "off", etc.), can accept commands and can emit events as the sense changes in their state. The state(s) of a canonical device may also be queried. This first device abstraction layer may enable users to connect together devices in their homes/offices without worrying about the precise technical specifications of their devices, thereby significantly easing device connectivity and creation of a "connected environment". Similarly, developers of the platform and software applications used to monitor/control physical devices may not have to write code suitable for the different technical specifications of the physical devices. Instead, they may develop software and computer programs for the canonical devices, which do not include the specifics of the real-world devices. The abstraction modules can perform the necessary modifications to enable the generic software to interact with the physical devices.

The system may take the abstraction further by providing a second device abstraction layer. The second device abstraction layer translates between canonical devices 42 and synthetic devices 44. As shown, there is a two way communication between the synthetic and canonical devices. The synthetic devices 44 may be remote from the physical device and/or the hub, i.e. they may be accessible via the cloud. Alternatively, local instances of synthetic devices may be provided in the hub. The concept of a synthetic device is explained later.

Object Capability Model

The platform backend may also comprise means to implement an object capability model. The object capability model is a computer security model that comprises a collection of "objects" that are connected to each other by "capabilities", and which uses the capabilities as the primary means of providing authority and controlling access to the objects. An object capability model may be provided for each of the canonical devices and/or the synthetic devices in the system. The model enables the permissions for users and/or the canonical/synthetic devices themselves to be individually defined for each device. The model may also determine the programming approach and programming languages used to implement the model within the system.

The model may be used to grant access to one device by another device. For example, a synthetic device composed of multiple canonical devices may be granted access to the data/outputs of the canonical devices, but not to the settings of the canonical devices. In another example, a canonical security system may be granted the right to turn on or re-position a canonical security camera (and thereby, the physical security camera with which it is associated), but not have the right to turn on/off a canonical (and physical) recording device that records the images captured by the physical camera.

The model may be used to grant access to users for limited functions (e.g. monitoring only), and for limited periods of time. Different objects may have different permissions. For additional security, the object capability model may use a caretaker object to store and define the permissions in relation an object. A caretaker pattern is a design pattern of writing software which is capable of providing revocable capabilities. The caretaker object gives revocable rights to users/third parties in relation to a device. The model can destroy the caretaker object as and when necessary, which removes access to a device. This may be particularly useful for consumer devices for which it is difficult to grant access to the device and/or data produced by the device. For example, a patient may be given a real health monitor by her doctor, which enables the doctor to remotely monitor the health of her patient. However, the patient may not be able to access the data collected by the health monitor themselves. The use of caretaker objects in the object capability model may enable a doctor to grant permission to a patient to access the data from the health monitor, but not to tamper with the data or change the device settings. The object capability model may be provided with reference to the canonical health monitor (or one or more canonical devices) that is associated with the real-world health monitor. This may enable a doctor to provide the same level of permissions to all her patients who have a health monitor, by simply defining the permissions of the canonical health monitor. The permissions of all the real-world health monitors which conform to the canonical health monitor will be automatically configured in the same way.

Connecting Physical Devices to the Platform

Figure 7:
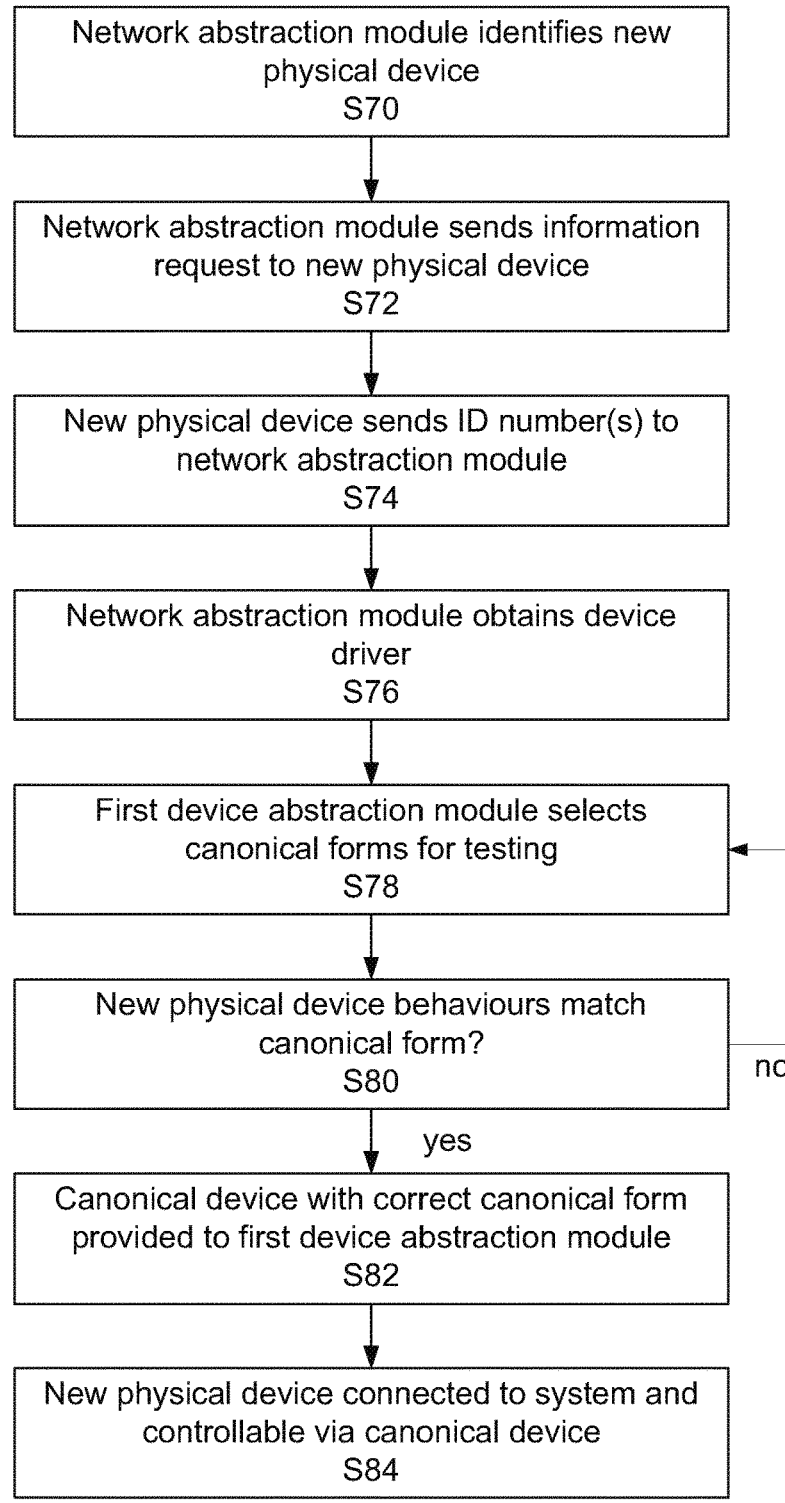
FIG. 7 is a flowchart outlining example steps in a process to connect a physical device into the system of FIG. 2.

As previously mentioned, the canonical forms define behaviours and tests to determine if a physical device (or a synthetic device) conforms to the defined behaviours. The canonical forms may be stored in the system, and may be called when a new physical device attempts to connect to the system. The canonical forms may be provided within the first device abstraction layer, or may be provided elsewhere, e.g. stored in the platform backend 32. FIG. 7 shows a flowchart illustrating example steps taken by the system of FIG. 2 when a new, physical device attempts to connect to the system. The flowchart shows how the system identifies the type of the physical device which is trying to connect to the system, by running through canonical form tests.

A new physical device may automatically attempt to connect to the system when switched on, or a user may take steps to connect the device to the system. A physical device may attempt to connect to the system directly through a gateway, or via an in-home hub device, as previously outlined. Whatever method is used, the networking abstraction module, which is located between the one or more physical devices and the system/platform, identifies or recognises that a new physical device exists in the environment and is attempting to connect to the system (S70). The networking abstraction module may comprise a processor or microprocessor within the module that is configured to perform the following steps to identify the physical device. The networking abstraction module (processor) transmits a message to the new physical device asking it to identify itself (S72). The new physical device sends a message back to the networking abstraction module with some information (e.g. identifiers or ID numbers) to help identify the device (S74). For example, physical devices which connect to a hub by a USB connection may include two ID numbers: a vendor ID, identifying the vendor or manufacturer of the physical device; and a device ID, identifying a specific device (model, type, etc.) made by the vendor. Physical devices which connect to the networking abstraction module in different ways may transmit the same or similar identifying information. The networking abstraction module uses this to obtain the appropriate device driver in order to communicate with the new physical device (S76). Device drivers are pieces of software that operate/control a physical device that is attached to a computer/computing system. The driver provides a software interface to the physical device, so that computer programs can access the hardware functions of the physical device without needing to know the precise details of the hardware itself.

The driver may be obtained from a store located within the system, or may be obtained from elsewhere (e.g. from a manufacturer's website accessed via the internet). In the case where a hub is used to connect the physical device into the system, a local copy of the driver may be stored in the hub so that it can be accessed easily. (The system/hub may be configured to periodically check for updates to the driver and to download updated versions as necessary). In the case where the physical device only provides the networking abstraction module with general information, e.g. that it is "a printer", the networking abstraction module may obtain a generic device driver that is suitable to provide the software interface. For example, it may obtain a generic printer driver which is sufficient to interact with the physical device.

Once the driver is obtained, the first device abstraction module attempts to map the physical device to one of the at least one pre-defined canonical forms, by trying to find one or more canonical forms which have the same behaviours/functions as the physical device (S78). In the case of a physical device having one function (e.g. a printer that is only able to print), the first device abstraction module maps the physical device to a pre-defined canonical form that defines that function. (If the system comprises a single pre-defined canonical form, the first device abstraction module must still check that the canonical form defines the same function as that of the physical device). Similarly, in the case of a physical device having two or more functions (e.g. a machine that is able to print, copy and scan), the first device abstraction module attempts to map each function to one or more pre-defined canonical forms that correspond to those functions.

The device abstraction module may comprise a processor/microprocessor configured to perform the mapping. The first device abstraction module may already have a clue as to the type of the new physical device, because the device driver has already been identified. This may help the device abstraction module to select a subset of the pre-defined canonical forms to test. For example, if a device driver for a 'printer' has been obtained, the device abstraction module may select those pre-defined canonical forms that relate to 'printers', 'print-and-scan devices', 'print-and-copy devices', 'photo-printers' etc. to check whether the physical device has any additional functions/behaviours, so that the correct canonical form is found. Additionally or alternatively, if the physical device is a printer with other functions (e.g. scanning and copying), the device abstraction module may select those pre-defined canonical forms which relate to "printing", "copying" and "scanning". The device abstraction module may test the canonical forms one-by-one to determine the type of the new physical device (S80). Once the canonical forms that match one or more of the behaviours of the new physical device has been identified, the device abstraction module obtains/provides one or more canonical devices that behave according to the matched canonical form(s) (S82). The canonical device(s) is an abstracted version of the new physical device, and is used by the system to monitor/control the new, connected physical device (S84). However, if one or more of the behaviours of the physical device cannot be mapped/matched to a canonical form, the physical device cannot be connected to the system, or may only have limited functionality (e.g. only those behaviours which have been represented by canonical devices may be controllable/monitorable by the system). The device abstraction module may send a message to the system administrator with any information known about the new physical device, which may enable new canonical forms to be written accordingly.

It will be appreciated that similar steps may be used to associate one or more canonical forms with a synthetic device, to enable a synthetic device to be monitored/controlled by the system.

Example: Canonical Device

Figure 5B:
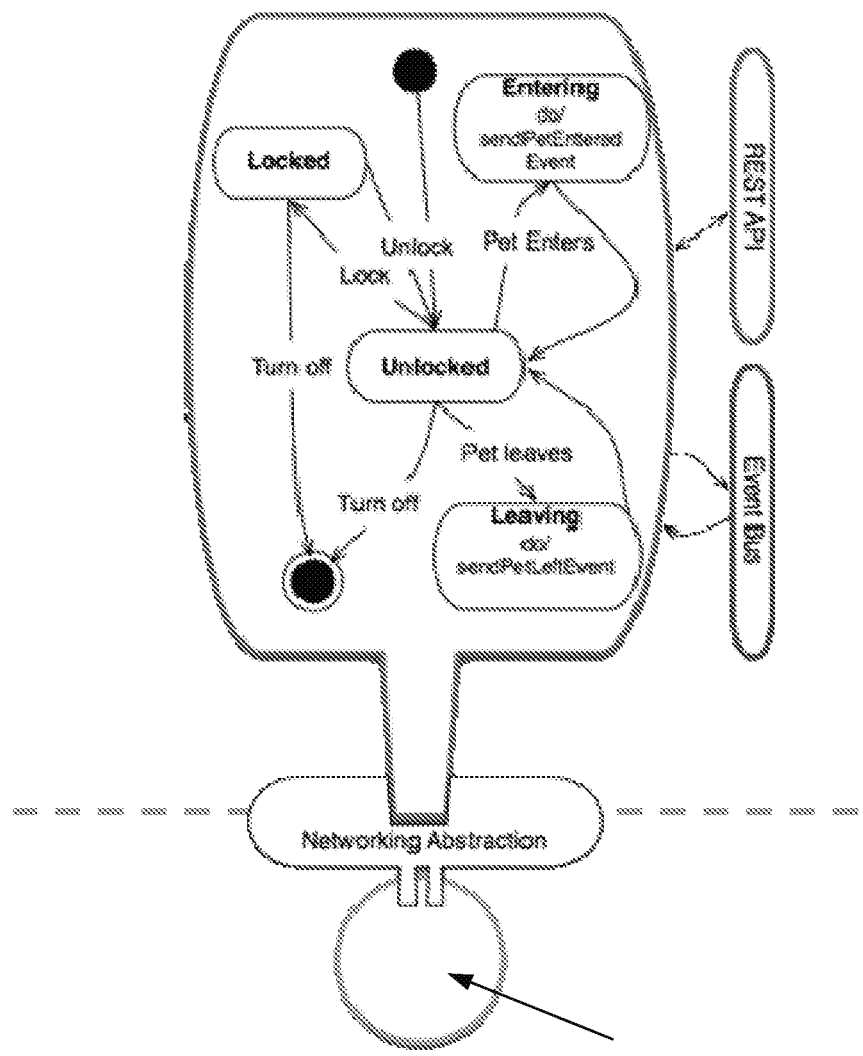
FIG. 5b shows a schematic of an example of a canonical device.

FIG. 5b shows an example of a canonical device 50. The canonical device is defined independently of the network protocol 52 that may be used by the real, physical device. A state or set of states is defined for each canonical device based on the canonical form behaviours associated with the canonical device. The set of states may include whether the device is "turned on", "turned off", "performing function x", "performing function y", etc. The functions x, y are specific to the behaviours of the canonical device, as defined by the canonical form. For example, for a thermostat, the states may include "measuring temperature", "changing temperature", "turning boiler on", "turning boiler off", "on", "off", etc. The canonical device may emit an event when the associated physical device is identified as being in a particular state, or when it is transitioning from one state to another. The canonical device may preferably define the actions or possibilities that can occur when the device is in a particular state. For example, if the canonical device is in an "off" state (because the associated physical device is also "off"), the possible actions are to remain in the current state, or to move to the "on" state. The canonical device may be used to turn on the associated physical device, by controlling the canonical device to move from the off state to the on state. This command is provided to the associated physical device by the system (in embodiments, via the hub device), to turn on the physical device. The pre-defined actions limit how the canonical (and physical) device may behave or be controlled.

Each canonical device may include an application programming interface (API) that defines how particular software components of the canonical device interact with each other. The canonical device may interact with the platform and with other devices via additional APIs, such as a representational state transfer API (or REST API), which is an abstraction of the world wide web, and an Event API or Event Bus to receive notifications of an event (e.g. notifications of a change in state in the associated physical device).

The example canonical device 50 shown in FIG. 5b is a canonical pet-flap or pet-door. The behaviours of the physical smart pet-door may have been broadly identified as 'sense the presence of a pet', 'open the pet-door when a pet is sensed to be in the vicinity of the pet-door', and 'close/lock the pet door when a pet is not sensed to be in the vicinity of the pet-door'. As mentioned earlier, the canonical devices may comprise state tables indicating the possible states the device can be in. The words in boxes within the canonical device represent possible states of a particular canonical device. In this example, the canonical pet-door may be in the "locked", "unlocked", "entering" or "leaving" state. The arrows between states define the actions that may result in a change in state, and define the possible options available when in a particular state. For example, if the pet-door is in the "locked" state, then it may stay locked, or it may move to a "turned-off" state, or it may be moved to an "unlocked" state, as shown by the arrows pointing away from the "locked" state box. Similarly, if the physical pet-door is unlocked, a pet may be passing through the pet-door. If the physical door is sensed to move in one direction (e.g. in towards a house), the pet may be entering a house through the pet-door, and the state moves from the "unlocked" state to the "entering" state (however temporarily). The change to the "entering" state may trigger an event or alert to let the system or an owner of the pet know that the pet has returned home. Similarly, if the pet-door is sensed as moving in the opposite direction, the canonical device moves from being in the "unlocked" state to the "leaving" state (however temporarily), where the change of state may trigger an event or alert. For example, if the device is in the "leaving" state, then the canonical device may trigger an event to "lock" the associated physical pet-flap for security. The events/alerts/commands may be transmitted via the event bus to other system components to enable the action to be implemented in the real, physical device.

Example: Synthetic Device

As mentioned earlier, a synthetic device is a composable logic block which can be used to provide new, virtual devices that may enable more user-friendly and understandable monitoring and/or control of a connected environment. FIG. 6 shows an example synthetic device formed of a number of canonical devices 50 including (in this case) a motion sensor, a smart plug and a camera, which may each use a different communication protocol 52 to connect to the internet/gateway. Synthetic devices may be formed of two or more canonical devices, two or more synthetic devices, or a combination of one or more canonical and synthetic devices. The canonical devices are linked to each other through an event bus, which enables notifications to be shared between the devices (e.g. through the event API of each device). The synthetic device 60 may also comprise a proposition or rule 54, which may be termed an assisted living proposition. The system processor receives inputs or data from the canonical devices and processes these inputs/data according to the rules/propositions of the synthetic device. The processor determines the state or output of the synthetic device dependent on the combination of the canonical device data and the rules.

Embodiments of the present system/platform may enable the one or more physical devices installed for one function or purpose to be used simultaneously for other functions, creating an explosion of value for end-users. For example, a physical device such as a thermostat for sensing temperature in a home may be used by a synthetic device for occupancy detection. In this example, a 'high' sensed temperature in a house or in an individual room in a house may be used by the synthetic occupancy detection device to determine that the house (or room) is currently occupied by a person. If the home owner did not expect the house to be occupied at that particular time, then the home owner may be alerted to the heating being on in an empty home, or the possibility of an intruder in the home. Thus, the output of a simple temperature sensing device could be used to provide a virtual security system.

As previously mentioned, a device rules engine may be provided within the system to contain rules or policies specifying particular actions that may be performed with respect to the physical devices in a particular connected environment. For example, in the case of a physical device such as a home heating system or thermostat, the rule specified for the physical device may simply be to "turn down the heating when the home is empty". Additionally or alternatively, the rules may be much more complex. For example, a burglar alarm system may have arming grace periods, partial-set modes etc., and thus the rules associated with the physical alarm system may be "turn on the alarm system if all the rooms in the house are determined to be empty for a period of time", or "turn on the alarm system on the ground floor of the house at night". The platform provides a simple framework where these application rules can be expressed, and they may be run in the home, in the cloud, or across both, without having to be rewritten to account for new devices. This is because the rules can be expressed in relation to the canonical representations of the real physical devices. For example, if a physical device breaks and is replaced by a new physical device that performs the same function but is made by a different manufacturer, the new physical device can be integrated into the platform without requiring the rules to be adapted to account for the precise technical specifications of the new physical device.

The example synthetic device shown in FIG. 6 shows how three canonical devices 50 may be combined with a proposition or rule 54 to provide "assisted living". The canonical motion sensor, canonical smart energy monitoring plug, and canonical camera may be combined to provide additional information about a home in which the associated physical devices are located. The synthetic device receives inputs from the physical devices (via their canonical representations), and processes the inputs according to the rules to determine if a property is occupied or not. The synthetic device could be used to monitor an elderly relative living on their own, to check remotely if they are in their home and okay. An example of a table of rules is set out below:

|  | Scenario 1 | Scenario 2 |
| --- | --- | --- |
| Input from "motion sensor" | Motion detected | Motion not detected |
| Input from "smart plug" | Energy being used by TV | Energy being used by TV |
| Input from "camera" | Person detected in images | Person detected in images |
| Output | Property occupied by person moving about. | Property unoccupied or person unwell |
| Event/Action | None (person is okay) | Alert sent to carer |

In the first scenario, the motion sensor and camera detect a person moving about in a home, who may be watching television. The fact they are moving about suggests that the person is well and the synthetic device is configured not to take any action. In the second scenario, energy is being drawn by the television, and although a person is detected by the camera, the motion sensor indicates they are not moving. This may because the person is asleep in front of the television, or because they are unwell or have fallen. The synthetic device may be configured to send an alert to a carer, a doctor, relative or the emergency services if the inputs received from the canonical devices don't change after a period of time. Thus, the synthetic device may be used to monitor and assist a person living on their own without being intrusive.

In another example, consider a home comprising a plurality of physical devices. The physical devices may be a smartphone, a thermostat and a boiler all connected to the system. The physical devices are mapped to canonical devices termed "mobile device", "temperature sensor" and "heating system" by the system in order to be monitored and/or controlled. A synthetic device termed an 'occupancy detecting' device comprises the canonical devices "mobile device", "temperature sensor" and "boiler" together with propositions/rules which define the functions or capabilities of the synthetic device. The synthetic occupancy detector provides a user with a single, virtual, user-friendly device that may be used to monitor the occupancy of a property (e.g. the user's home or office).

The synthetic device receives inputs from the physical devices (via their canonical representations), and processes the inputs according to the rules to determine if a property is occupied or not. An example of a table of rules is set out below:

|  | Scenario 1 | Scenario 2 |
| --- | --- | --- |
| Input from "mobile device" | Detected in property | Not detected in property |
| Input from "temp sensor" | Set for comfort | Set for comfort |
| Input from "heat system" | On | On |
| Output | Property occupied | Property not occupied |
| Message | None | Alert sent |

In the second scenario above, the user is alerted to the fact that the boiler is firing in an empty property. To save energy, the user may use the synthetic device to turn off the boiler, or turn down the thermostat setting remotely (or they may use other software to perform these operations remotely). The synthetic device therefore has a capability that the individual physical devices may not possess on their own.

If the synthetic occupancy device also comprises a canonical device related to a security camera/motion sensor located in a property, the synthetic device can use the inputs from the devices to check if there is an intruder in the property. For example, the table of rules can be expanded as follows:

|  | Scenario 1 | Scenario 2 |
| --- | --- | --- |
| Input from "mobile device" | Detected in property | Not detected in property |
| Input from "temp sensor" | Set for comfort | Low setting |
| Input from "heat system" | On | Off |
| Input from "camera" | Movement detected | Movement detected |
| Output | Property occupied | Intruder |
| Message | None | Alert sent |

In this case, the rules determine that there is an intruder. The processor which is applying this synthetic device may be configured to automatically send a message/email to the home owner or to a security service to alert them to the possible intruder.

In this example, the object capability model may grant a home owner full control over a synthetic 'occupancy detecting' device, so that they can configure the device for their home/office. The model may also grant a home owner with the right to control their heating system remotely. (The permission is in relation to the canonical device which maps to the real-world heating system). The user may themselves be able to grant limited permissions to a third party in relation to the heating system. For example, the home owner may grant permissions to other people living in the home with respect to the temperature settings in their own bedrooms. In another example, a user may grant their gas supplier with the right to monitor the operation of the boiler when it is turned on, so that the gas supplier can check if the boiler is operating correctly and inform the user of a potential problem. However, for security, the gas supplier may not have the right to control the heating system itself (e.g. to change the thermostat setting), in order to minimise the risk of any malicious, unauthorised activity. Similarly, the gas supplier may not have the right to monitor or access boiler on/off times because such information may indirectly indicate whether a property is occupied or not, which could be used maliciously.

Figure 8:
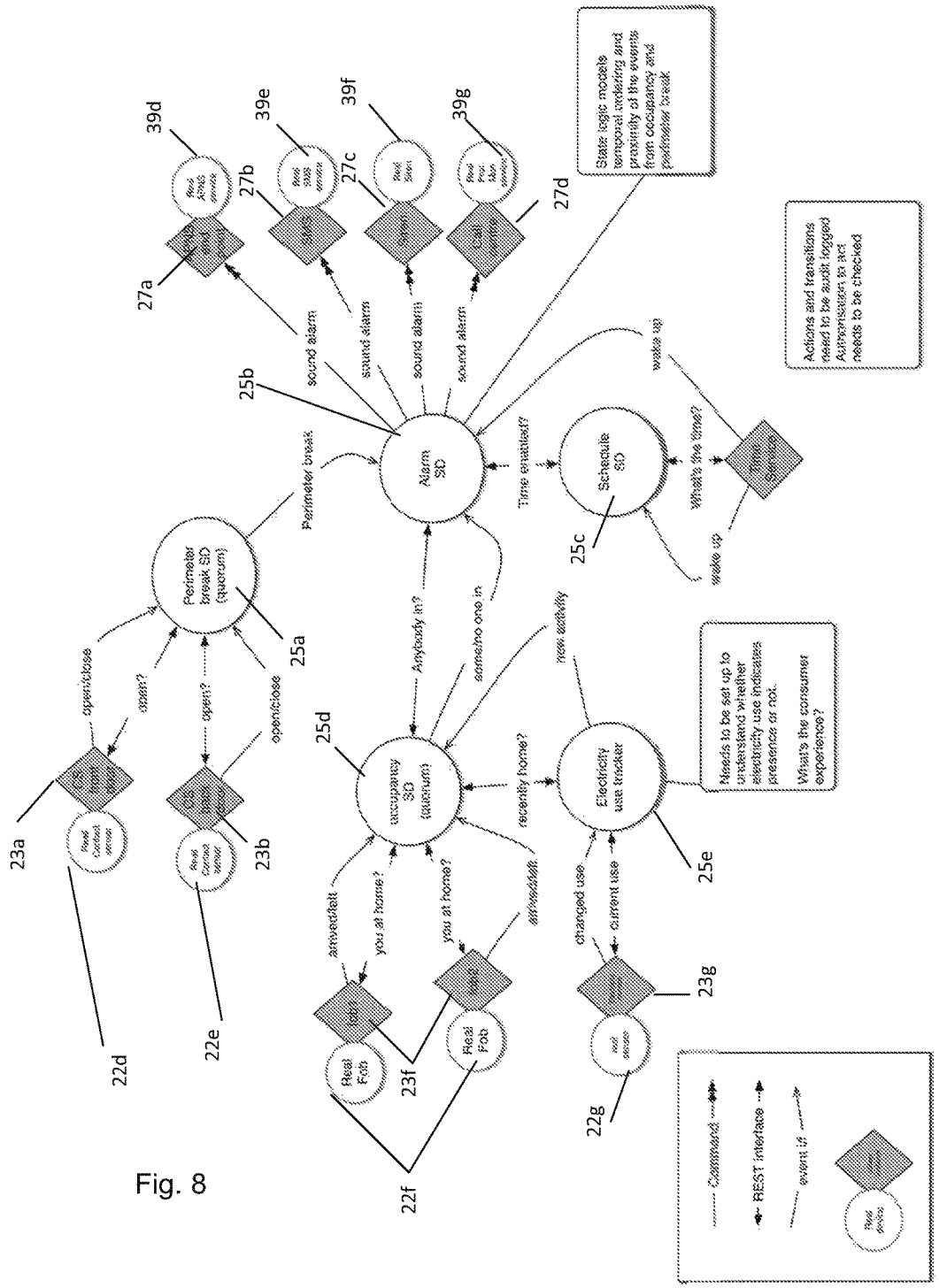
FIG. 8 shows an example of a connected environment formed using the system of FIG. 2 comprising multiple physical, canonical and synthetic devices.

FIG. 8 shows a schematic of an example configured environment consisting of real, canonical and synthetic devices. The connected environment may include a variety of physical devices such as electricity usage monitors, sensors, key fobs, and services such as an SMS service. These are all communicated with via canonical representations, shown by the diamonds. The canonical devices are used to determine the state of the associated physical device and the information may feed into a synthetic device.

For example, a first synthetic device (SD) 25a termed a perimeter break SD comprises the canonical devices 23a, 23b for the physical devices 22d, e (i.e. contact sensors on a front and back door in a property). The physical devices are for two different sensors and thus have two different canonical devices—a front door CS and a back door CS. If the synthetic device 25a receives input from one or both of the physical devices via the associated canonical device that a door is open, the synthetic device may send a message indicating that there has been a perimeter break to a second synthetic device 25b which is an alarm SD 25b. The first synthetic device may regularly poll the physical devices via the canonical devices (on a REST interface) to query whether or not the door is open.

This second synthetic device 25b communicates with a plurality of user devices including a APNS service 39d, a SMS service 39e, a siren 39f and a professional monitoring service 39g each via an associated and different canonical device 23c,23e, 23f, 23g. As shown, the second synthetic device 25b will send a command to each of the user-side devices to sound an alarm, if certain conditions are met.

This second synthetic device 25b communicates with a plurality of user devices including a APNS service 39d, a SMS service 39e, a siren 39f and a professional monitoring service 39g each associated with and controlled via different device driver instances 27a-d. User-end devices (e.g. smartphones or tablet computers) may not be controllable by the system via canonical devices/synthetic devices. However, as mentioned above, individual sensors or functions in a user-end device may be controlled/monitored by the system via canonical devices that match the function(s) of the sensors. Similarly, certain user-end device processes (e.g. the ability of a smartphone to send an SMS message) may be accessible by the system (e.g. to send an SMS message). As shown, the second synthetic device 25b may access the APNS service 39d on a user device via the device driver instance 27a to send a command to each of the user-side devices to sound an alarm, if certain conditions are met.

The occupancy SD also comprises an electricity use tracker synthetic device 25e comprises one physical device which is a sensor 22g which communicates with the electricity use tracker synthetic device 25e via a canonical device which represents an electricity monitor 23g. A change in electricity use is monitored by the sensor and a message is sent from the physical device via the canonical device to the synthetic device when a change is detected. The synthetic device may regularly poll the physical devices via the canonical devices to query whether the current use has changed. When the electricity use tracker synthetic device 25e determines that electricity use has changed it sends a message to the occupancy SD to indicate that there is new activity which may indicate that a user is home. The occupancy SD may regularly poll the electricity use tracker synthetic device 25e. This synthetic device needs to be set up to understand whether electricity use indicates whether or not a user is present. This can be based on a typical consumer experience. A message from the electricity use tracker synthetic device 25e that a user is home may also trigger the message from the occupancy SD to the alarm SD.

Both the schedule SD 25c and the alarm SD 25b may receive a message from a time service canonical device to wake up, for example based on a user set schedule. The alarm SD may only thus be activated after receiving this message. The alarm SD may poll the schedule SD to check that time has been enabled and the schedule SD may poll the time service canonical device to check the time.

Thus, if the synthetic alarm receives data from other synthetic devices that indicate that a property is occupied when the people living in the property aren't there, the synthetic alarm sends a command to one or more physical devices (via their canonical representations) to send an SMS alert to the home owner or a security service, or to sound a real alarm. The object capability model may be used in this connected environment to allow a security service to have temporary access to the output of a security camera in the property, so they can check if the property is being broken-into before sending out personnel to the property. The permissions may be granted temporarily and only if the synthetic alarm sends an alert to the security service alerting them to the possible break-in. The permissions may be revoked as soon as the situation has been dealt with and the synthetic alarm reverts back to the state where it has not detected a break-in.

No doubt many other effective alternatives will occur to the skilled person. It will be understood that the invention is not limited to the described embodiments and encompasses modifications apparent to those skilled in the art lying within the scope of the claims appended hereto and more generally, the foregoing has been a detailed description of illustrative embodiments of the invention. Various modifications and additions can be made without departing from the scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein the terms "process" and/or "processor" should be taken broadly to include a variety of electronic hardware and/or software based functions and components. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Accordingly, this description is meant to be taken only by way of example, and not to otherwise limit the scope of this invention.

The invention claimed is:

1. A system for interconnecting and coordinating a plurality of devices, services and applications, the system comprising:
   at least one physical device;
   a first database storing at least one pre-defined canonical device, wherein the canonical device corresponds to a pre-defined canonical form, the canonical form defining a set of minimum capabilities for a type of physical device, wherein the at least one physical device is associated with at least one canonical device which matches at least some of the capabilities of the physical device;
   a second database storing one or more synthetic devices, wherein each synthetic device comprises one or more canonical devices and at least one rule, the at least one rule defining how the one or more canonical devices are combined to form the synthetic device; and
   at least one processor which is configured to: associate the at least one physical device to the at least one pre-defined canonical device by comparing the capabilities of the physical device with the set of minimum capabilities defined by the canonical form; and
   control the at least one physical device via the associated canonical device by applying the at least one rule for a synthetic device incorporating the associated canonical device;
   wherein the at least one processor is configured to implement an object capability model which defines security permissions associated with each canonical and synthetic device;

wherein the at least one processor is further configured to control the at least one physical device by applying the security permissions set by the object capability model; and wherein the at least one processor comprises at least one of:
a first processor which is associated with the first database and which associates the at least one physical device to a canonical device; and a second processor which is located in a remote server and which is configured to control the at least one physical device.

2. The system as claimed in claim 1 further comprising a plurality of physical devices.

3. The system as claimed in claim 2, wherein the plurality of physical devices are located at one or more locations.

4. The system as claimed in claim 3 wherein one of the one or more locations is a home or an office or a mobile location, for example a vehicle.

5. The system as claimed in claim 3 wherein the plurality of physical devices comprises a mobile device or a wearable device, located with or on a human or animal.

6. The system as claimed in claim 2 wherein the physical devices include a thermostat, a boiler and a smartphone.

7. The system as claimed in claim 6 wherein the synthetic device is an occupancy detector composed of a first canonical device associated with and which receives data from the thermostat, a second canonical device associated with and which receives data from the boiler and a third canonical device associated with and which receives data from the smartphone, and at least one rule to define when the property is occupied based on data from the canonical device, wherein the at least one processor is configured to process data received from the first, second and third canonical devices in conjunction with the at least one rule of the synthetic device to determine if the property is occupied by a human.

8. The system as claimed in claim 7 wherein the at least one rule is that the property is occupied when
the data from the canonical device associated with the thermostat indicates that the temperature in a property has been set for human comfort,
the data from the canonical device associated with the boiler indicates that the boiler is firing, and the data from the canonical device associated with the smart phone indicates that there is a smartphone signal in the property.

9. The system as claimed in claim 8, wherein if the at least one processor determines that the property is unoccupied and the boiler is firing, the at least one processor sends an alert to the user interface to prompt the user to remotely switch-off the boiler or remotely lower the temperature of the thermostat.

10. The system as claimed in claim 6 wherein the object capability model grants the security permissions at least one of:
to a third party to monitor the operation of the boiler;
to occupants of the property to control the thermostat.

11. The system as claimed in claim 1, wherein the object capability model is a computer security model defining the security permissions granted to the user, each canonical device and each synthetic device to access the functions and data of the other canonical, synthetic and physical devices.

12. The system as claimed in claim 11 wherein the object capability model grants the security permissions to the user and to each canonical device and each synthetic device for a specified time period, wherein expiration of the time period automatically revokes the security permissions.

13. The system as claimed in claim 11 wherein the user is a third party and wherein the object capability model is configured to grant the security permissions to the third party which limit the third party's access to the functions and data produced by the canonical, synthetic and physical devices.

14. The system as claimed in claim 1 wherein:
the first database stores a plurality of pre-defined canonical devices, wherein each canonical device corresponds to one of a plurality of pre-defined canonical forms, each canonical form defining a set of minimum capabilities for a type of physical device, wherein the at least one physical device is associated with at least one canonical device which matches at least some of the capabilities of the physical device; and
the at least one processor is configured to:
associate the at least one physical device to one of the pre-defined canonical devices by comparing the capabilities of the physical device with the set of minimum capabilities defined by one of the canonical forms, and
select the canonical device corresponding to the canonical form which matches the capabilities of the compared physical device.

15. The system as claimed in claim 1 further comprising a user interface to enable a user to perform at least one of: monitoring the at least one physical device; and controlling the at least one physical device.

16. The system as claimed in claim 15 wherein the user interface is one of:
a graphical user interface provided on a computing device or mobile computing device;
a web-based user interface; and
a cloud-based user interface.

17. The system as claimed in claim 15, wherein the processor is configured to control each physical device in response to a user input on the user interface.

18. The system as claimed in claim 1 further comprising a networking abstraction module configured to:
communicate with the at least one physical device by one or more networking protocols; and
remove details of the one or more networking protocols from the system.

19. The system as claimed in claim 18 wherein the system further comprises a hub device to which of the at least one physical device is coupled for connection into the system, and wherein the hub device comprises the networking abstraction module.

20. The system as claimed in claim 19 wherein the hub device is a hardware device coupled to a wired or wireless internet router.

21. The system as claimed in claim 19 wherein at least one of the first database, the second database, and the database for the object capability model is located in the hub or in a remote server.

22. A method performed by at least one processor for interconnecting and coordinating a plurality of devices, services and applications in a single platform, the method comprising:
receiving a request to connect to the platform from a physical device, the request including identity data to identify the physical device;
obtaining a device driver corresponding to the identified physical device;
selecting one of at least one pre-defined canonical forms, each canonical form defining a set of minimum capabilities for a type of physical device;

comparing capabilities of the physical device with the set of minimum capabilities defined by the selected canonical form to determine if at least some of the capabilities of the physical device match those of the canonical form;

wherein if the capabilities match, the method further comprises:

selecting a canonical device corresponding to the matched canonical form, and associating the canonical device with the physical device; and monitoring the physical device via the associated canonical device;

the method further comprising implementing, by the at least one processor, an object capability model which defines security permissions associated with each canonical and synthetic device; and controlling, by the at least one processor, the at least one physical device by applying the security permissions set by the object capability model; and wherein the at least one processor comprises at least one of:

a first processor which is associated with the first database and which associates the at least one physical device to a canonical device; and a second processor which is located in a remote server and which is configured to control the at least one physical device.

23. A system for interconnecting and coordinating a plurality of devices, services and applications, the system comprising:

a plurality of physical devices;

a first database storing a plurality of pre-defined canonical devices, wherein each canonical device corresponds to one of a plurality of pre-defined canonical forms, each canonical form defining a set of minimum capabilities for a type of physical device, wherein each of the plurality of physical devices is associated with at least one canonical device corresponding to a canonical form having minimum capabilities which match at least some minimum capabilities of the physical device;

a second database storing one or more synthetic devices, wherein each synthetic device comprises one or more canonical devices and at least one rule, the at least one rule defining how the one or more canonical devices are combined to form the synthetic device;

at least one third database storing an object capability model which controls security permissions associated with each canonical and synthetic device;

and at least one processor which is configured to:
associate each of the physical devices to one of the pre-defined canonical devices by comparing capabilities of each physical device with the set of minimum capabilities defined by one of the canonical forms, and selecting the canonical device corresponding to the canonical form which matches the capabilities of the compared physical device; and control each of the plurality of physical devices via the associated canonical device by applying the at least one rule for a synthetic device incorporating the associated canonical device and by applying the security permissions set by the object capability model;

wherein the at least one processor is configured to implement the object capability model which defines the security permissions associated with each canonical and synthetic device; and wherein the at least one processor comprises at least one of:

a first processor which is associated with the first database and which associates the at least one physical device to the canonical device; and a second processor which is located in a remote server and which is configured to control the at least one physical device.

* * * * *